United States Patent
Kurian et al.

(10) Patent No.: US 6,902,802 B2
(45) Date of Patent: Jun. 7, 2005

(54) LOW TEMPERATURE HEAT-SEALABLE POLYESTER FILM AND METHOD FOR PRODUCING THE SAME

(75) Inventors: Joseph V. Kurian, Hockessin, DE (US); Diane M. Hahm, Boothwyn, PA (US); Benjamin A. Smillie, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/641,828

(22) Filed: Aug. 15, 2003

(65) Prior Publication Data

US 2004/0058174 A1 Mar. 25, 2004

Related U.S. Application Data

(62) Division of application No. 09/799,442, filed on Mar. 5, 2001, now Pat. No. 6,663,977.
(60) Provisional application No. 60/187,663, filed on Mar. 7, 2000.

(51) Int. Cl.$^7$ .......................... B32B 27/08; B32B 27/36; B32B 31/24; B32B 31/26; B32B 31/30

(52) U.S. Cl. ...................... 428/349; 428/480; 428/343; 428/346; 428/347; 428/355 R; 528/308; 528/308.1; 528/308.6; 528/308.7; 525/437; 525/444; 156/308.2; 156/325; 156/327; 156/332; 156/244.11; 156/244.23; 156/244.24; 264/173.16

(58) Field of Search ................................. 428/480, 343, 428/346, 347, 349, 355 R; 528/308, 308.1, 308.6, 308.7; 525/165, 173, 437, 444; 156/308.2, 325, 327, 332, 244.11, 244.23, 244.24; 264/173.16

(56) References Cited

U.S. PATENT DOCUMENTS

| | | | | |
|---|---|---|---|---|
| 4,167,541 A | * | 9/1979 | Alexander | 525/444 |
| 4,397,986 A | * | 8/1983 | Hornbaker | 525/64 |
| 4,410,473 A | | 10/1983 | Iohara et al. | |
| 4,454,196 A | | 6/1984 | Iohara et al. | |
| 4,475,330 A | | 10/1984 | Kimura et al. | |
| 4,578,437 A | | 3/1986 | Light et al. | |
| 5,156,904 A | * | 10/1992 | Rice et al. | 428/219 |
| 5,183,623 A | | 2/1993 | Kawaguichi et al. | |
| 5,627,236 A | | 5/1997 | Deyrup et al. | |
| 5,989,665 A | | 11/1999 | Connell et al. | |
| 5,994,451 A | * | 11/1999 | Dangayach | 524/539 |
| 6,183,848 B1 | | 2/2001 | Turner et al. | |
| 6,335,421 B1 | * | 1/2002 | Kurian et al. | 528/279 |
| 6,444,299 B1 | * | 9/2002 | Baek et al. | 428/219 |

FOREIGN PATENT DOCUMENTS

| | | |
|---|---|---|
| JP | 10-279707 | 10/1998 |
| JP | 11322963 | 11/1999 |
| JP | 2001206963 | 7/2001 |

OTHER PUBLICATIONS

W. Oppermann, et al., Properties and morphology of polyester blends and of fibers made therefrom, Chemical Fibers International, Mar. 1999, 33–35, 49.

* cited by examiner

*Primary Examiner*—Vivian Chen

(57) ABSTRACT

The present invention provides a heat-sealable polyester composition having an amorphous processing window ranging from a Tg in the range of about 40° C. to about 70° C., to a Tcg in the range of about 70° C. to about 150° C. The composition preferably contains a mixture of poly(ethylene terephthalate) homopolymer or copolymer and poly (trimethylene terephthalate) homopolymer or copolymer, either as a physical blend or as a copolyester oligomer or polymer prepared from the respective monomers. The resulting composition is heat-sealable at low temperatures, retains barrier properties and is non-flavor-scalping.

6 Claims, 19 Drawing Sheets

LOW TEMPERATURE HEAT-SEALABLE POLYESTER FILM AND METHOD FOR PRODUCING THE SAME

CROSS-REFERENCE TO RELATED APPLICATIONS

This Application is a divisional of application Ser. No. 09/799,442, filed Mar. 5, 2001, U.S. Pat. No. 6,663,977, which claim the benefit of priority to provisional application 60/187,663 filed Mar. 7, 2000.

BACKGROUND OF THE INVENTION

1. Field of the Invention

The present invention relates to a heat-sealable polyester composition and the production of heat-sealable polyester film having an amorphous processing window ranging from a Tg in the range of about 40° C. to about 70° C., to a Tcg in the range of about 70° C. to about 150° C. This invention specifically relates to modification of poly(ethylene terephthalate) homopolymer or copolymer by the addition of poly(trimethylene terephthalate) homopolymer or copolymer, which results in a polymer blend or copolyester with a low Tg and high Tcg, making it heat-sealable at lower temperatures, yet retaining moderate barrier properties.

2. Description of the Related Art

Poly(ethylene terephthalate), herein referred to as 2GT or PET, and copolyesters thereof (e.g., copolyesters with isophthalate (I) or cyclohexane dimethanol (CHDM) to make 2GT-1,2G-CHDM/T or 2G-CHDM/T-I) are known to be useful for packaging goods or foods that are sensitive to flavor loss or absorbing ambient flavors and odors, i.e., flavor scalping. For example, see U.S. Pat. No. 4,578,437. These resins are also useful to provide grease resistance. In addition, these polyesters provide moderate barrier to the transmission of oxygen, carbon dioxide, and/or water vapor.

In packaging and other applications, heat-sealing is used to join thermoplastic parts. This is done by applying heat to the surfaces to be joined to soften or melt them while applying some pressure to the place where they need to be joined. Most commonly the heating is carried out by contacting the surfaces opposite those to be joined with a hot object, such as a hot bar or heating the surfaces with hot air, infra-red radiation, ultrasonic, or induction heating. The speed at which one can heat the surfaces to be joined to the proper temperature for joining often determines the speed at which one can heat-seal the surfaces. High-speed heat-sealing is important because many such operations are high-volume, continuous operations where slow heat-sealing speeds significantly increase costs.

It would be desirable to seal the polyesters described above using thermal sealing equipment at fast sealing speeds, and still achieve strong seals. This has traditionally been difficult to achieve with 2GT homopolymer or copolymer because of the high glass transition temperature (Tg) of these compositions, typically greater than about 70° C. Amorphous (non-crystalline) polyester films or articles will not form heat seals with themselves until the temperature of the two seal-forming surfaces are raised to a range above the glass transition.

Poly(trimethylene terephthalate), herein referred to as 3GT, also referred to as poly(propylene terephthalate) or PPT, is a polyester prepared by the condensation polymerization of 1,3-propane diol and terephthalic acid. Poly (trimethylene terephthalate) may also be prepared from 1,3-propanediol and dimethylterephthalate (DMT) in a two-vessel process using tetraisopropyl titanate catalyst, Tyzor® TPT (a registered trademark of E. I. du Pont de Nemours and Company). Molten DMT is added to 1,3-propane diol and catalyst at about 185° C. in a transesterification vessel, and the temperature is increased to 210° C. while methanol is removed. The resulting intermediate is transferred to a polycondensation vessel where the pressure is reduced to one millibar (10.2 kg/cm$^2$), and the temperature is increased to 255° C. When the desired melt viscosity is reached, the pressure is increased and the polymer may be extruded, cooled, and cut into pellets.

3GT has better oxygen barrier and flavor barrier properties compared to 2GT, but has a much lower glass transition temperature, typically around 50° C. Unfortunately 3GT does not have stable heat-sealing performance because of the low Tg and small amorphous processing window. That is, the temperature range between the Tg and Tcg (i.e., the ΔT between the glass transition temperature and the peak temperature of crystallization from the amorphous state) is very small so the amorphous film or part tends to age or crystallize before it seals. Once a 3GT-containing film or part crystallizes it is very difficult to achieve strong seals at temperatures below the melt temperature.

U.S. Pat. No. 5,183,623 describes a process for producing transparent and heat-resistant polyester films for containers by thermoforming techniques. The sheets are produced from a melt polyester resin having at least 80 mole % ester units derived from 1,3-propanediol and terephthalic acid or ester-forming derivative thereof. The polyester resin has at least 80 mole % 3GT based on the entirety of the repeating units in the polymer chain; this equates to approximately 80% by weight 3GT. The solid resin sheet has low crystallinity, and after aging the sheet is shaped by thermoforming under specific conditions to result in a highly crystalline container U.S. Pat. No. 5,989,665 discloses a copolyester comprising the reaction product of a glycol component comprising from about 85 to 100 mole % 1,3-propanediol, or approximately 85.8 to 100 weight % of the same. The copolyester is disclosed to be useful in packaging applications.

U.S. Pat. No. 5,627,236 discloses a multi-phase composition of a copolyester continuous phase and a low modulus discontinuous phase. The discontinuous phase may be elastomeric, non-elastomeric, crosslinked, branched or straight chain. Particularly useful as the discontinuous phase are ethylene copolymers or terpolymers. The composition provides high temperature viscosity stability and excellent long-term, heat-seal and barrier properties.

Japanese Kokai Patent Application No. HEI 10[1998]-279707 discloses a copolyester film, preferably containing 3 to 35 wt. percent of 1,3-propanediol as the glycol component. The film is heat treated at a temperature in the range of 100–180° C. to increase the resistance against deterioration of the film with time so that the incidence of film breakage is greatly reduced. The resulting film has a rate of extension of more than 100% after storage at 40° C. for 5 days, among other properties.

There is a need for a polymer possessing the best barrier properties of 2GT and 3GT, that can be easily heat-sealed at low sealing bar temperatures and fast sealing speeds, yet still produces seals of high strength. Especially for use in packaging, it would be preferred that such polymer produce clear parts and films.

BRIEF SUMMARY OF THE INVENTION

The invention herein provides a heat-sealable polyester composition having an amorphous processing window ranging from a glass transition temperature, Tg, in the range of about 40° C. to about 70° C. to a peak crystallization temperature from the amorphous state, Tcg, in the range of about 70° C. to about 150° C.

The invention herein further provides a heat-sealable polyester composition comprising poly(ethylene terephthalate) homopolymer or copolymer and about 5% to about 95% by weight poly(trimethylene terephthalate) homopolymer or copolymer, preferably 20% to 80% by weight, and more preferably 30% to 70% by weight, based on the total weight of poly(ethylene terephthalate) and poly(trimethylene terephthalate).

Also provided is a process for lowering the Tg of poly (ethylene terephthalate) homopolymer or copolymer comprising the steps of:
(a) adding poly(trimethylene terephthalate) homopolymer or copolymer to crystallized poly(ethylene terephthalate) homopolymer or copolymer to form a blend;
(b) drying the blend by exposing the blend to a flow of at least 1 ft$^3$/minute of dry air having a dew point less than –5° F., at a temperature ranging from about 120° C. to about 130° C., for at least about six hours or until sufficient drying has occurred;
(c) melt blending the blend to form a polymer having a lower Tg than the poly(ethylene terephthalate) of step (a).

The invention further provides a process for making a low-temperature, heat-sealable polyester film comprising the steps of:
(a) adding poly(trimethylene terephthalate) homopolymer or copolymer to crystallized poly(ethylene terephthalate) homopolymer or copolymer to form a blend;
(b) drying the blend by exposing the blend to a flow of at least 1 ft$^3$/minute of dry air having a dew point less than –5° F., at a temperature ranging from about 120° C. to about 130° C., for at least about six hours or until sufficient drying has occurred;
(c) melt blending the blend to form a polymer having a lower Tg than the poly(ethylene terephthalate) of step (a).

The invention also provides a process for heat-sealing two thermoplastics wherein the two thermoplastic surfaces are sealed to one another by the application of heat and pressure, wherein the improvement comprises at least one of said thermoplastics comprises a polyester composition comprising a blend of poly(ethylene terephthalate) homopolymer or copolymer and poly(trimethylene terephthalate) homopolymer or copolymer, or copolymer formed from the respective monomers.

The invention also provides an article wherein two thermoplastic surfaces have been heat-sealed, wherein at least one of said thermoplastic surfaces comprises a polyester composition comprising a blend of poly(ethylene terephthalate) homopolymer or copolymer and poly (trimethylene terephthalate) homopolymer or copolymer, or a copolymer formed from the respective monomers.

The present invention also provides a method for producing a heat-sealable film or sheet comprising the steps of:
(a) extruding a mixture of two distinct polyester fractions comprising from 95 to 5 parts by weight of a poly (ethylene terephthalate) homopolymer or copolymer fraction and from 5 to 95 parts by weight of a poly (trimethylene terephthalate) homopolymer or copolymer fraction wherein said extruding is performed at a polymer residence time in an extruder and die of from 1 to 15 minutes at a temperature from 235 to 290° C.;
(b) quenching the extruded polyester melt produced in step (a); and
(c) recovering a polyester film or sheet having an amorphous processing window ranging from a glass transition temperature, Tg, in the range of about 40° C. to about 70° C. to a peak crystallization temperature from the amorphous state, Tcg, in the range of about 70° C. to about 150° C.

In this later process the two distinct polyester fractions preferably comprise pellets of poly(ethylene terephthalate) homopolymer, pellets of poly(ethylene terephthalate) copolymer or their mixture as one distinct polyester fraction and pellets of poly(trimethylene terephthalate) homopolymer, pellets of poly(trimethylene terephthalate) copolymer, or their mixture as another distinct polyester fraction. Preferably one or more of the two distinct polyester fractions are dried prior to extruding by exposing the fraction(s) to a flow of at least 1 ft$^3$/minute of dry air having a dew point less than –5° F., at a temperature ranging from about 120° C. to about 130° C., for at least about six hours.

According to this later method of the instant invention, it has been discovered that transesterification of the 2GT/3GT homopolymer/copolymer mixture during the extended residence time at extrusion temperature can be confirmed by NMR and advantageously correlated with the desired low temperature, heat-sealablity of the resulting polyester film. More specifically, a peak at approximately 8.038 ppm of the $^1$H NMR spectrum, 500 MHz and higher in tce-d$_2$, deuterated tetrchloroethytlene, @ 120° C., (located between major homopolymer NMR peaks associated with 2GT and 3GT) has been observed to correlate with the improved heat-sealability of the amorphous polymer film.

DETAILED DESCRIPTION OF THE INVENTION

Figure 1:
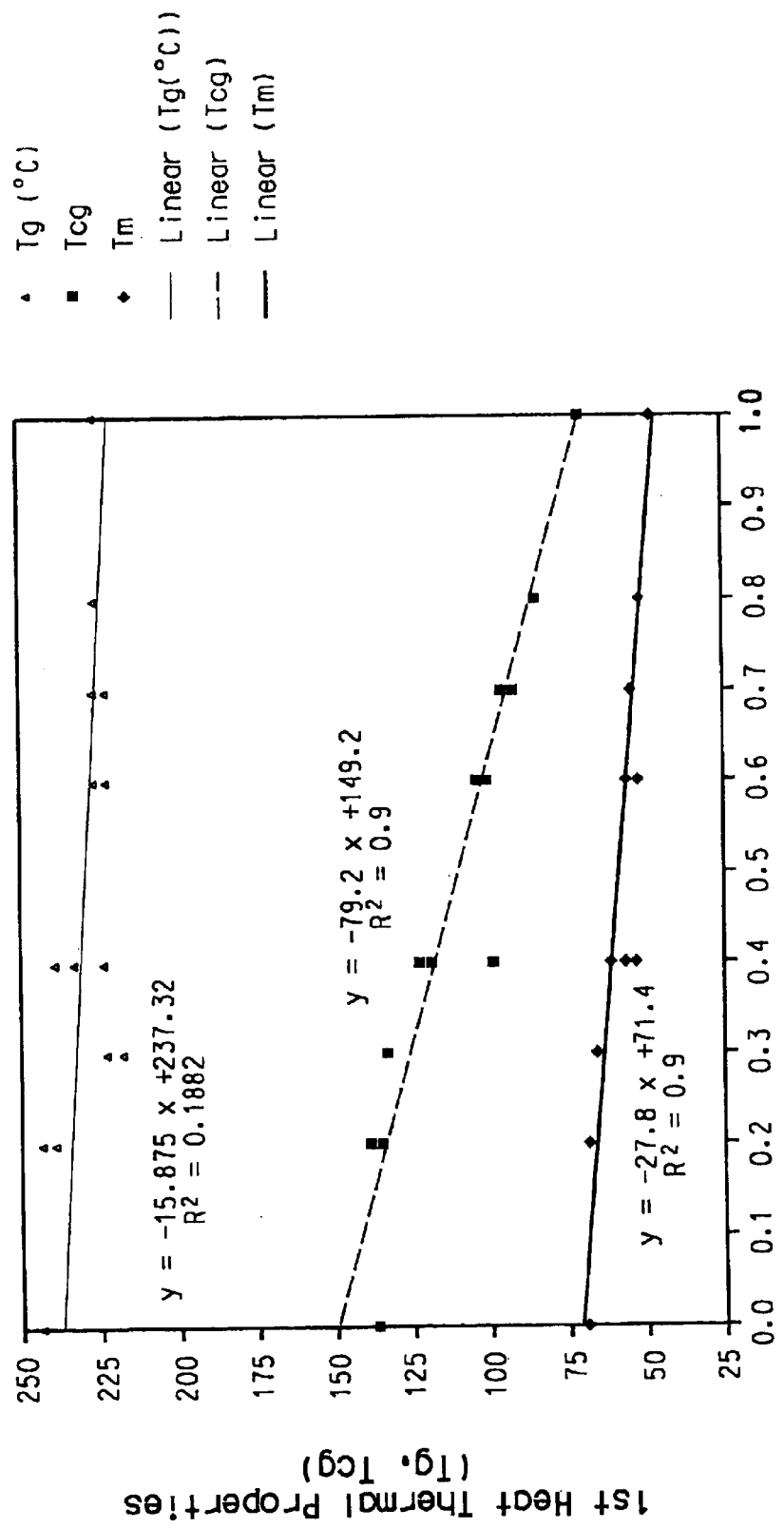
FIG. 1 is a graph showing the first heat thermal properties of amorphous film samples, using the data in Table 6.

For purposes of the following disclosure the following definitions are to apply:

In this disclosure, "amorphous processing window" means the temperature range between a polymer's glass transition temperature, Tg, and the peak temperature of crystallization from the amorphous state, i.e., the cold crystallization temperature, Tcg.

The term "copolymer" means a polymer polymerized from three or more monomers, and thereby includes terpolymers, or more precisely, a polymer containing two or more repeat units.

The term "distinct polyesters" means polyesters prepared from monomers wherein at least one monomer is different between the polyesters.

The term "homopolymer" means a polymer polymerized from two monomers (e.g., one type of glycol and one type of diacid (or methyl ester of diacid)), or more precisely, a polymer containing one repeat unit.

The term "physical blend" means a uniform, intimate mixture of two or more polymers formed by melt blending and optionally compounding.

Tg means the glass transition temperature of a polymer. Typically this is measured by using a differential scanning calorimeter (DSC) per ASTM D3417 at a heating rate of 10° C./min for heating and cooling, and the mid-point of inflection is reported.

And, Tcg means the peak temperature of crystallization from the amorphous state, measured by using a DSC per ASTM D3417 at a heating rate of 10° C./min for heating and cooling.

Applicants have found a heat-sealable polyester composition that exhibits a broad amorphous processing window, specifically because the Tg of the polymer is relatively low. Since the temperature at which the heat-seal may be formed is lowered, films of such polymers can be processed at high heat-sealing speeds, thus lowering production costs and increasing efficiency. Additionally, the polyester films exhibit improved flavor-barrier properties, good oxygen and/or carbon dioxide barrier properties and are optically clear.

Specifically, the amorphous processing window of such composition ranges from a glass transition temperature, Tg, in the range of about 40° C. to about 70° C., preferably about 48° C. to about 70° C., to a peak temperature of crystallization from the amorphous state, Tcg, in the range of about 70° C. to about 150° C., preferably about 84° to about 135° C.

The melting point of the polyester composition is in the range of about 180° C. to about 240° C., preferably less than about 240° C. When the polyester composition of the invention herein is a physical blend the composition will most likely exhibit at least two distinct melting points when measured using a DSC per ASTM D3417. The intrinsic viscosity (IV), as measured using a 1:1 by weight solution of dichloromethane and trifluoroacetic acid at a temperature of 19° C. as described in the examples below, generally ranges from about 0.4 dl/g to about 2.0 dl/g, preferably about 0.80 dl/g to about 1.5 dl/g.

The polyester composition is preferably a 2GT homopolymer or copolymer modified by the addition of about 5% to about 95% by weight 3GT homopolymer or copolymer, preferably about 20% to about 80% by weight, and most preferably about 30% to about 70% by weight, based on the total weight of 2GT and 3GT. When the polyester composition is a copolyester, the amount of 3GT is preferably about 40% to about 75% by weight, based on the total weight of 2GT and 3GT. While not bound by any particular theory or explanation, Applicants believe that the addition of the 3GT polymer to the 2GT polymer broadens the amorphous processing window, essentially by lowering Tg as compared to the 2GT before the addition, and/or retarding crystallization.

The composition is either a physical blend of two distinct polyesters, e.g., 2GT and 3GT polymers or a copolyester oligomer or polymer prepared from the respective monomers, e.g. terephthalic acid, ethylene glycol, 1,3-propane diol, and optionally other ester-forming monomers. If the composition comprises a physical blend, then the IV after physical blending is at least about 0.4 dl/g.

A 2GT homopolymer is intended to mean a polymer substantially derived from the polymerization of ethylene glycol with terephthalic acid, or alternatively, derived from the ester forming equivalents thereof (e.g., any reactants which can be polymerized to ultimately provide a polymer of polyethylene terephthalate). A copolymer of 2GT is intended to mean any polymer comprising (or derived from) at least about 70 mole percent ethylene terephthalate and the remainder of the polymer being derived from monomers other than terephthalic acid and ethylene glycol (or their ester forming equivalents).

The 2GT polyesters useful in the present invention include: (a) Poly(ethylene terephthalate) homopolymer; and (b) 2GT copolymers, i.e. 2GT polymer modified by incorporating diacids other than terephthalic acid (such as isophthalic acid (I), trimellitic anhydride, trimesic acid, aliphatic diacids including adipic acid, dodecane dioic acid, CHDA (cyclohexanedicarboxylic acid) or glycols other than ethylene glycol (such as cyclohexane dimethanol (CHDM), diethylene glycol), and mixtures thereof. Impurities from the recycle stream of a polyester process are another source of monomers.

The 2GT polyesters used according to the present invention should be thermoplastic and crystallizable, having a glass transition temperature (Tg) of at least about 60° C., and a melting point of at least 150° C. The more preferred polyesters will have a melting point of at least 200° C. The most preferred polyester is 2GT copolymer with about 1% to 15% isophthalic acid. The level of diethylene glycol (DEG) will preferably range up to about 2 weight percent. Amorphous polymers are less desirable because they are more difficult to dry.

A 3GT homopolymer is intended to mean a polymer substantially derived from the polymerization of 1,3-propane diol with terephthalic acid, or alternatively, derived from the ester forming equivalents thereof (e.g., any reactants which can be polymerized to ultimately provide a polymer of poly(trimethylene terephthalate)). A copolymer of 3GT is intended to mean any polymer comprising (or derived from) at least about 70 mole percent trimethylene terephthalate and the remainder of the polymer being derived from monomers other than terephthalic acid and 1,3-propane diol (or their ester forming equivalents). From a practical standpoint, the higher percentage of trimethylene terephthalate ensures the polymer is semicrystalline and thereby easier to dry.

The polyester composition should have an appropriate molecular weight to obtain sufficient mechanical properties. In terms of its intrinsic viscosity (IV), the composition after blending preferably has an IV of at least about 0.4 dl/g to about 0.80 dl/g, more preferably at least about 0.90 dl/g, and most preferably about 1.3 to 1.5 dl/g, as measured in a 1:1 by weight solution of dichloromethane and trifluoroacetic acid. Intrinsic viscosity is determined by measuring the flow time of a solution of known polymer concentration and the flow time of the polymer solvent in a capillary viscometer, as set forth in ASTM D2857.95 at 19° C.

The resulting composition is essentially amorphous (i.e., exhibiting essentially no crystallinity) and preferably exhibits an oxygen transmission rate (OTR) ranging from about 5 to about 12 cc-mil/day-100 sq in-atm at 23° C. and dry, as measured per the procedure in the examples, similar to ASTM D3985-81. The composition also is preferably clear (though colorants may be added if desired) and exhibits good flavor barrier properties, i.e., low flavor permeation, low flavor scalping and no importation of odors and flavors to the package contents. Most important, the composition usually is heat-sealable at relatively low temperatures, and has good heat-seal strength and hot-tack strength to support most packaging applications.

The compositions of the invention may be formed into films (meant to include sheets) or other articles. The film may be a monolayer film, or a multilayer film formed in a coextrusion with other film layers including polyolefins, ethylene copolymers, ionomers, polyamides, polycarbonates, acrylics, polystyrenes, adhesive tie layers, recloseable adhesives ethylene vinyl alcohol, PVDC, etc. The monolayer film can also be laminated to other films or substrates. A multilayer film will have two or more layers, and preferably one or both of the surface layers will be a heat-sealable polyester composition as described herein. Because of the property of low-temperature heat-sealability, films of the invention herein can be easily coextruded with polyolefins to other layers using an adhesive tie layer such as an ethylene vinyl acetate (EVA) or an anhydride modified EMA. Such multilayer films expand the possible applications of the invention herein, since other layers can impart additional desired characteristics such as mechanical strength, toughness, additional barrier properties, heat resistance, printability, among others.

The films of the invention herein are particularly useful for packaging applications, and can be formed into packages by the many methods known to those skilled in the art. By the term "package" is meant any container that is meant to be sealed most of the time, especially before the contents are used, against ambient conditions such as air and/or moisture, and/or loss of the package's content by evaporation, and includes lidding applications (e.g., trays or containers covered by a removable lidding film). The package may be designed so that the seal against ambient conditions may be broken permanently as by cutting or tearing to open a sealed bag, or may be meant to remain sealed while in use, e.g., gel packs that are heated and applied as heating pads. These packages are preferably made from the mono- or multilayer films disclosed herein, especially multilayer films, in which the heat-sealable polyester compositions of the invention herein comprise the "sealing layer", i.e., the layer which forms a heat-seal. Such packages are extremely useful for packaging foods because of the oxygen barrier functionality and good flavor/odor barrier with non-scalping and low impartation, are formable and clear. Thus, they are especially preferred for packaging where taste and/or smell retention is important. The packages may be flexible bags which are sealed, such as solid or liquid food containers, intravenous bags, pouches, dry food containers (cereal liners, cracker liners in boxes), chemical pouches, stand-up pouches, cereal pouches, lidding, pet food bags, etc., among others.

Although not required, conventional additives may be added to the compositions, films or articles of the invention herein. Such additives include pigments, colorants, stabilizers, antioxidants, extrusion aids, slip agents, carbon black, nucleating agents, flame retardant, others known to those of skill in the art, and mixtures thereof.

Films made from the compositions of the invention herein may certainly be used for a myriad of other uses, unrelated to packaging. For example, one possible use is a home dry cleaning bag that consumers use in a clothes dryer. Such a bag is typically heat-sealed along three sides, leaving a recloseable fourth side for receiving the clothes to be cleaned and the cleaning chemicals. Such a bag must have good dimensional stability at high temperatures, e.g., greater than about 200° F., as well as good barrier to the dry cleaning chemicals. The heat-sealable composition herein may be blended as a pellet blend of 2GT, 3GT (as described herein) along with nylon (e.g., nylon-6), and then extrusion coated onto cast, or oriented (biaxially or monoaxially oriented) polyamide (nylon-6, or nylon-6,6) or 2GT films. The resulting film can be used to make a dry cleaning bag. Many other uses are contemplated.

The invention herein also provides a process for lowering the Tg of 2GT homopolymer or copolymer. The process can begin with drying the crystallized 2GT homopolymer or copolymer and either separately drying or simultaneously drying the 3GT homopolymer or copolymer. The drying is conducted by exposing the polymers to a flow of at least 1 ft$^3$/minute of dry air having a dew point less than −5° F., at a temperature ranging from about 120° C. to about 130° C., for at least about six hours or until sufficient drying has occurred. If dried separately, the 3GT homo or copolymer is next added to the 2GT homo or copolymer to form a physical blend. However, the preferable method is to blend pellets of the 3GT homo or copolymer with pellets of the 2GT homo or copolymer, and then dry them simultaneously as discussed above.

The physical blend is a uniform, intimate mixture of the two polymers formed by melt blending. Melt blending may be accomplished by various methods known to those of skill in the art including: (1) drying the blend of pellets discussed in the preceding paragraph and extruding to form a polymer melt; (2) melt compounding the dried blend of pellets and then making film or other articles; and optionally solid-state polymerizing prior to forming into film or other articles. Alternatively, the respective monomers of the 2GT and 3GT may be copolymerized to achieve similar properties. Either as a physical blend or a copolymer, the resulting polymer/film has a lower Tg than the original 2GT homo or copolymer.

The invention also provides a process for making a low-temperature, heat-sealable polyester film. The first step is to dry and mix (or alternatively mix and then dry) and melt blend the 2GT and 3GT to form a physical blend as described above. Alternatively, the respective monomers of the 2GT and 3GT may be copolymerized. The resulting physical blend or copolymer is extruded to form a monolayer or multilayer film.

The invention further provides a process for heat-sealing two thermoplastics wherein the two thermoplastic surfaces are sealed to one another by the application of heat and pressure. The improvement resides in at least one of the thermoplastic surfaces comprising a polyester composition comprising 2GT homopolymer or copolymer and 3GT homopolymer or copolymer. The foregoing discussion of the polyester composition disclosed herein applies equally to such surface.

The invention also provides an article wherein two thermoplastic surfaces have been heat-sealed, and at least one of said thermoplastic surfaces comprises a polyester composition comprising 2GT homopolymer or copolymer and 3GT homopolymer or copolymer. Both surfaces of the article(s) to be heat-sealed may have a surface of the polyester composition as described herein, though applications where only one surface comprises the polyester compositions are also contemplated, e.g., lidding applications. The foregoing discussion of the polyester composition disclosed herein applies equally to such thermoplastic surface(s). If both surfaces to be heat-sealed comprise the polyester composition, then preferably a composition of these two surfaces is made from the same monomer(s), and more preferably the surfaces are made from essentially the same polymer.

More than two surfaces may be sealed together, for example, three films may be sealed together as long as all the surfaces being sealed are of the composition described herein. Preferably the heating of the areas to be sealed is done by thermal conduction from a hotter material (e.g., sealing bar(s) or roller(s)), by microwave heating, dielectric heating, ultrasonic, etc.).

The amount of pressure used may vary from that needed to contact the two (or more) surfaces to be sealed, for example finger pressure to pressure applied by presses or rollers, e.g., up to about 90 pounds per square inch of sealing bar. The heating may be before, or simultaneous with the application of pressure. Although pressure may be applied before heating, it will normally not be effective until the heating is carried out.

The temperature of the heat-sealable polyester composition sealing surface, which is being sealed, will generally be above the Tg and less than the Tcg. Since much of the heat-sealing done commercially is on high-speed lines, the lower the temperature needed to give a seal of sufficient strength, the faster the line may often run, since it will take less time to heat the sealing surface to the required temperature.

Articles wherein two thermoplastic surfaces have been heat-sealed as disclosed herein include, injection, compression, thermoformed or blow-molded parts; monolayer and multilayer films and sheets and packages made therefrom (also as described above); foil, paper or paperboard coated with the heat-sealable polyester composition herein and packages made therefrom.

The invention will be further clarified by the following examples, which are intended to be purely exemplary only.

EXAMPLES 1–6

Examples 1–6 demonstrate surprising improvement in "as made" low temperature heat-seal strength and breadth of hot tack strength by making monolayer cast film from blends of 3GT resin with 2GT/I resin.

Resin Drying;

Two polymers were dried separately. The first was a polyester copolymer of ethylene glycol, terephthalic acid (T) and isophthalic acid (I), i.e., 2GT/I, having a DEG content of about 1.5 wt. % based on the total weight of the polymer, 2 mole % I based on total moles acid, and 98 mole % T based on total moles acid, with a melt point of 241° C. and a nominal IV of 0.8 dl/g. The second polymer was a homopolymer of 1,3 propanediol and dimethyl terephthalate (3GT) with a melt point of 230° C. and a nominal IV of 1.1 dl/g. The two polymers were individually dried overnight in a desiccated hot air dryer (dew-point less than −20° C. and dryer set-point of 125° C.).

Pellet/Pellet Blends;

After drying, pellet to pellet blends of 2GT/I and 3GT were prepared by mixing the resins in a 20 liter volume plastic pail.

Film Casting;

The blended pellets were immediately fed to the nitrogen swept hopper of a 1¼" diameter 30/1 L/D single screw extruder fitted with a 3/1 compression ratio, single flighted screw with 5 L/D of a melt mixing section. The extruder die was a 6" wide coat hanger type flat film die with a 0.012" die gap. The extruder and die were built by Wayne Machine 100 Furler St. Totowa N.J. 07512-1896. The molten polymer film exiting from the die drawn down to nominally 0.0015" thick as it was cast onto an 8" wide, by 8" diameter double shell spiral baffle casting roll fitted with controlled temperature cooling water. The casting roll was built by Killion Extruders—Davis Standard 200 Commerce Road, Cedar Grove N.J. 07009.

The quenched cast film was wound onto a 3" diameter paper core and stored in a polyethylene bag. A summary of the blend compositions, along with extruder and casting roll operating conditions are provided in Table 1 and Table 2

TABLE 1

| | Blend Information | | | | | |
|---|---|---|---|---|---|---|
| Example # | 1 | 2 | 3 | 4 | 5 | 6 |
| RESIN | 3GT | 3GT | 3GT | 3GT | 3GT | |
| Wt. % | 100 | 80 | 60 | 40 | 20 | |
| RESIN | | 2GT/I | 2GT/I | 2GT/I | 2GT/I | 2GT/I |
| Wt. % | | 20 | 40 | 60 | 80 | 100 |
| EXTRUDER CONDITIONS | Temp | Temp | Temp | Temp | Temp | Temp |
| Barrel Zone 1° C. | 260 | 260 | 270 | 285 | 285 | 285 |
| Barrel Zone 2 | 250 | 250 | 250 | 265 | 270 | 270 |
| Barrel Zone 3 | 240 | 240 | 250 | 265 | 265 | 270 |
| Barrel Zone 4 | 240 | 240 | 250 | 260 | 265 | 270 |
| Filter Flange - Die 1 | 240 | 240 | 250 | 250 | 260 | 270 |
| Adapter - Die 2 | 240 | 240 | 240 | 250 | 260 | 270 |
| Feed Block - Die 3 | 240 | 240 | 240 | 250 | 260 | 270 |
| End Flanges - Die 4 | 250 | 250 | 240 | 260 | 260 | 270 |
| Flat Die - Die 5 | 250 | 250 | 250 | 260 | 260 | 270 |
| Filter Melt | 236 | 236 | 244 | 248 | 258 | 267 |
| Adapter Melt | 240 | 240 | 240 | 248 | 260 | 260 |
| Before Filter - Pressure (psi) | 1180 | 1780 | 1620 | 1260 | 1350 | 1230 |
| After Filter Pressur (psi) | 450 | 510 | 590 | 440 | 520 | 450 |
| Screw R.P.M. | 40 | 40 | 40 | 40 | 40 | 40 |
| Screw Amps | 2.7 | 2.7 | 2.7 | 2.5 | 2.6 | 2.6 |

TABLE 2

| | CASTING UNIT | | | | | |
|---|---|---|---|---|---|---|
| Example # | 1 | 2 | 3 | 4 | 5 | 6 |
| Casting Roll - F.P.M. | 45 | 45 | 45 | 45 | 45 | 45 |
| Haul Off Roll - ratio to cast roll speed | 1.0 | 1.0 | 1.0 | 1.0 | 1.0 | 1.0 |
| Bowed Roll - ratio to cast roll speed | 1.0 | 1.0 | 1.0 | 1.0 | 1.0 | 1.0 |
| Edge Pinners - PSI | YES | YES | YES | YES | YES | YES |
| Haul Off Roll Nip - PSI | 50 | 50 | 50 | 50 | 50 | 50 |
| Film Gauge (mls) | 1.59 | 1.78 | 1.67 | 1.59 | 1.63 | 1.54 |
| Layflat (in) | 4.5 | 4.5 | 4.35 | 4.5 | 4.5 | |
| Thru-put (gm/min) | 95 | 94 | 91 | 94 | 95 | 98 |
| Thru-put (lb/hr) | 13 | 12 | 12 | 12 | 12 | 13 |
| H2O Recirculation Unit Temperature Set/Act ° F. | 60 | 60 | 60 | 60 | 60 | 60 |

Film Analysis;

The monolayer cast films were used to measure the heat seal properties. The lowest sealing bar temperature at which strong seals occur is of interest because low heat seal initiation implies less heat is required to generate a seal. Less heat means lower sealing bar temperatures can be used which extends the sealing jaw life (reduces maintenance costs) and also correlates to faster line speeds because seals occur faster. Heat seals were measured following ASTM procedure F88, using a 12.5 μm (0.5 mil) DuPont Mylar® film slip sheet, a 40 psi sealing bar pressure, a 0.64 cm (0.25") wide sealing bar, and a 1.0 sec dwell. Heat was applied to the upper bar only. The resulting seal strengths were measured on 0.5" wide sealed strips using an SP—102C-3 m90 Slip/Peel tester Supplied by IMASS, Inc. Box 134 Accord Mass. 02018-0134 at 10"/minute cross head speed.

The heat seal strength on the mono-layer cast films are summarized in Table 3.

TABLE 3

Heat Seal Strength for Six Example films.
Units of seal strength are gm/0.5 in.

| Bar Setpoint Temp ° C. | Example 1 | 2 | 3 | 4 | 5 | 6 |
|---|---|---|---|---|---|---|
| 90 | 0 | 0 | 0 | 0 | 0 | 0 |
| 100 | 0 | 0 | 17 | 95 | 37 | 36 |
| 110 | 0 | 0 | 164 | 939 | 570 | 127 |
| 120 | 0 | 0 | 480 | 973 | 1400 | 995 |
| 130 | 0 | 0 | 508 | 1070 | 1085 | 1077 |
| 140 | 0 | 367 | 831 | 1273 | 1130 | 1780 |

Example films 1 and 6 (the pure 3GT and 2GT/I respectively) had either no seal strength or very low seal strengths (less than 150 g/½") at a sealing bar set-point temperature of 90, 100 or 110° C.

Surprisingly the films made from blends containing 40 to 20% 3GT in 2GT/I (example films 4 and 5) had strong heat seal strengths (greater than 500 g/½") at sealing bar temperatures as low as 110° C.

The mono-layer cast film samples were also used to measure the hot tack strength. In the heat seal test the seals are allowed to cool to room temperature prior to measuring the seal strength. The hot tack test measures the seal strength of the still hot seal. Hot tack strength is required in horizontal or vertical form/fill seal applications, where a load (the package contents) is placed on the seal almost immediately after forming the seal since the whole forming and filling operation occurs in seconds.

A JB hot tack tester model 3000 version 2, built in the Netherlands was used to measure the hot tack strength. Machine conditions and test results are given in Table 4.

TABLE 4

Hot Tack Strength for Six Cast Mono-Layer Films.
Units of Hot Tack strength are reported in gms/inch of seal.

| | | Conditions | | |
|---|---|---|---|---|
| Seal pressure (N/mm2) | Seal time (sec) | Cool time (sec) | Peel speed (200 mm/s) | Sample width (mm) |
| 0.10 | 1.00 | 0.20 | 200 | 25 |

| Upper and Lower Bar setpoint temp. ° C. | Example 1 | 2 | 3 | 4 | 5 | 6 |
|---|---|---|---|---|---|---|
| 90 | 205 | 837 | 953 | 1193 | 68 | 17 |
| 100 | 74 | 483 | 950 | 1420 | 1503 | 362 |
| 110 | 52 | 492 | 1013 | 791 | 1513 | 1349 |
| 120 | 33 | 305 | 676 | 908 | 941 | 832 |
| 130 | 106 | 258 | 532 | 1115 | 769 | 703 |
| 140 | 89 | 297 | 593 | 681 | 660 | 849 |

The example films 1 and 6 (pure 3GT and pure 2GT/I) had again low hot tack strengths at sealing bar temperatures of 90 or 100° C. (300 g/inch or less). The hot tack strength on the blends of 3GT with 2GT/I were surprisingly good, with values on the 40%3GT/60% 2GT/I blend (Example 4) of over 1000 g/inch at a sealing bar set-point temperature of 90° C. Note also that the hot tack strength remained very good for example films 3 and 4 over the complete range of temperatures studied.

Solution Viscosity was measured on the six mono-layer film samples. Sample preparation and analysis are provided in Table 5. Solution viscosity is a means of estimating molecular weight.

TABLE 5

Solution Viscosity Measurements
ANALYSIS: Polyester Intrinsic Viscosity, per ASTM D2857.95
SOLVENT: 50/50 wt % Trifluoroacetic Acid/Dichloromethane
SAMPLE CONCENTRATION: 0.4 g/dL
TEMPERATURE: 19° C.

| Example | IV Result |
|---|---|
| 1 | 1.035 |
| 2 | 0.983 |
| 3 | 0.942 |
| 4 | 0.897 |
| 5 | 0.853 |
| 6 | 0.813 |

The six mono-layer film samples were analyzed to measure thermal properties. Prior to measuring thermal properties the films samples were first dried overnight, then heated at 255° C. for 5 minutes and then immediately cooled in a bath of methanol and dry ice. The resulting specially conditioned samples would be essentially free of any crystallinity (amorphous) prior to loading into the TA Instruments Differential Scanning Calorimeter, Model # 2920. Samples were heated from −40° C. to 275° C. at a heating rate of 10° C./min (according to ASTM D3417).

In Table 6, the properties from the first heating of these six films sample are summarized. Tg represents the glass transition temperature in ° C. (mid-point of inflection is reported). Tcg represents the peak temperature in ° C. at which the amorphous sample crystallizes upon heating. Delta H Tcg represents the heat evolved from the sample (in J/g) due to crystallization. Tm is the peak melting temperature of the sample in ° C. Delta H Tm is the heat consumed by the sample in J/g during melting.

TABLE 6

First Heat Thermal Properties on Amorphous Film Samples

|   | Tg (° C.) | Tcg (° C.) | deltaH (Tcg) J/g | Tm (° C.) | deltaH (Tm) J/g |
|---|---|---|---|---|---|
| 1 | 46.2 | 71.4 | 22 | 229.2 | 57 |
| 2 | 48.0 | 83.9 | — | 228.5 | 58 |
| 3 | 52.4 | 99.8 | 25 | 225.6 | 49 |
| 4 | 60.0 | 121.6 | 26 | 241.6 | 42 |
| 5 | 70.1 | 135.1 | 27 | 244.6 | 28 |
| 6 | 69.2 | 137.1 | 25 | 245.1 | 26 |

FIG. 1, graphically represents the data in Table 6. Based upon the heat seal and hot tack tests results, the combination of a Tg range from 48 to 70° C. (80% to 20% 3GT; or approximately 50° C. to 66° C. per the linear correlation) and Tcg range from 84 to 135 (or approximately 86° C. to 135° C. per the linear correlation) provides surprisingly better heat-seal and hot tack than straight 2GT/I (Tg 70, Tcg 144) or 3GT (Tg 46, Tcg 71).

Example films 2 to 5 showed that surprisingly good "as made" hot tack strength (at low sealing bar temperatures) could be achieved with films made from blends of 3GT and 2GT/I. The Example 1 film sample which was made from straight 3GT had poor "as made" heat seal and hot tack. The example 6 film sample, made from the 2GT/I resin had good "as made" heat seal and hot tack but only at elevated sealing bar temperatures.

Figure 2:
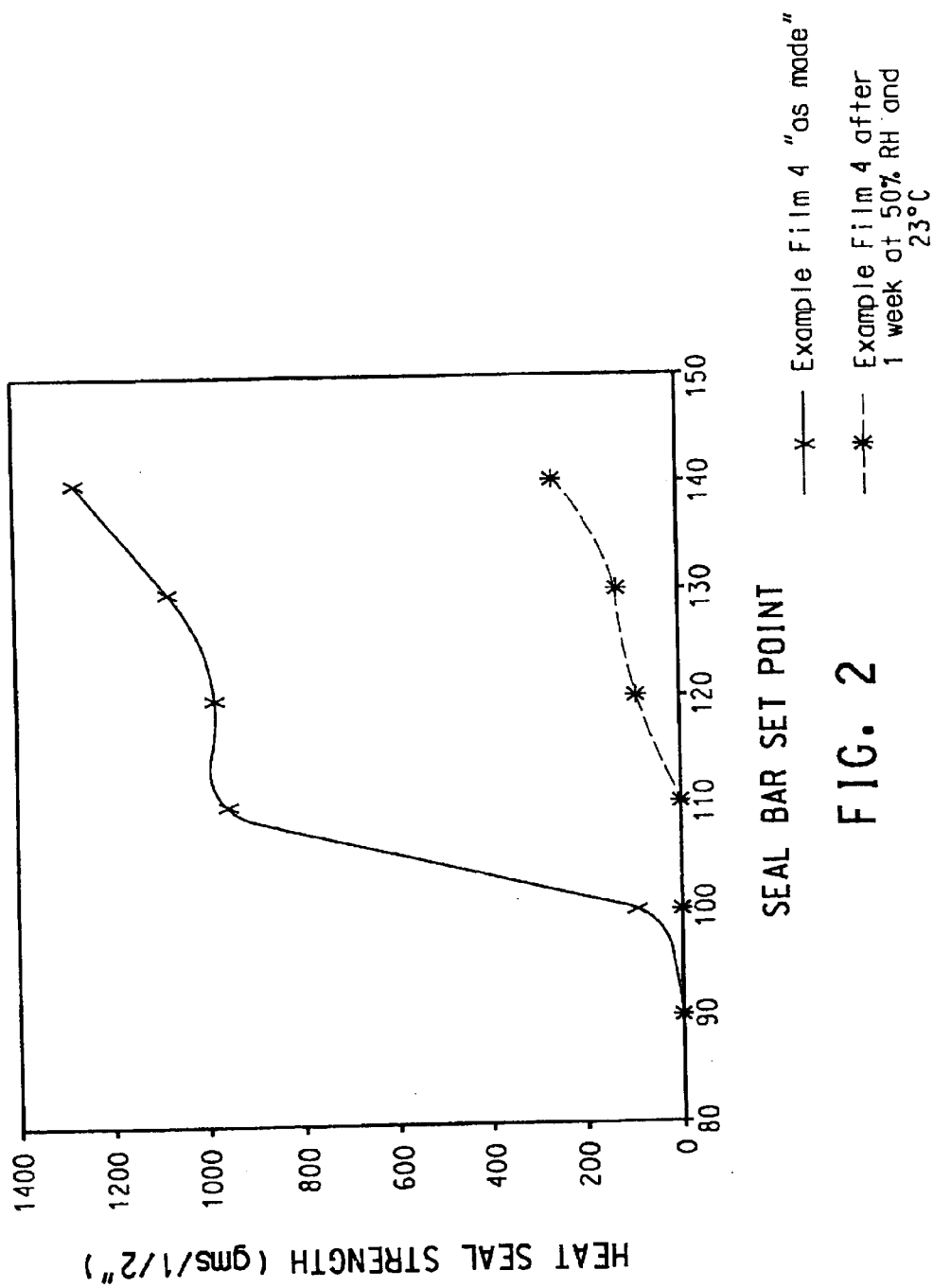
FIG. 2 is a graph showing the changes in heat-seal initiation and strength upon exposure of an amorphous film sample to ambient conditions for one week.

Upon exposing the amorphous film samples to ambient conditions of temperature and humidity, the sealing and hot tack properties appeared to deteriorate. FIG. 2 illustrates the changes in heat seal initiation and strength upon exposure of example film 4 to ambient conditions for one week.

Example films 1 to 6 were also used to measure Oxygen Transmission and Moisture Vapor Transmission Rate. Oxygen transmission was measured using an Oxtran® 2/20 Model H, low transmission rate tester (Mocon, Inc., Minneapolis, Minn. 55428 U.S.A.) at 23° C. and 0% relative humidity using 100% oxygen (not air). The theory of the test is outlined in ASTM D3985-81 "Standard test Method for Oxygen Gas Transmission Rate through plastic film and sheeting using coulometric sensor". Results are reported per 25 pm thickness (1 mil).

Values were corrected to a barometric pressure of 101 kPa (760 mmHg).

Samples were conditioned for 4 h prior to testing.

Test area was 50 $cm^2$.

Examine time was 60 min.

Moisture Vapor Transmission was measured using a Permatran® W 3/31, water vapor transmission system (Mocon, Inc.) at 38° C. and 90–100% RH. The theory of the test is outlined in ASTM D 1249-90 "Standard Test Method for Water Vapor Transmission through plastic film and sheeting using a modulated infrared sensor". Results are reported per 25 μm (1 mil) thick thickness.

Sample test area was 50 $cm^2$.

Relative Humidity was essentially 100%.

Sample was conditioned 2 h before testing.

Examine time was 30 min.

Test temperature was 37.8° C.

The Oxygen transmission rate on moisture vapor transmission rates are reported in Table A.

TABLE A

| Example Film | Cc O2 * 25 μ/100 $in^2$/day at 23° C. and dry | gH2O * 25 μ/100 $in^2$/day at 38° C. and 90–100% RH |
|---|---|---|
| 1 | 7.5 | 4.1 |
| 2 | 9.1 | 4.3 |
| 3 | 9.6 | 4.3 |
| 4 | 9.1 | 4.0 |
| 5 | 9.8 | 4.3 |
| 6 | 12.6 | 4.5 |

Figure 3:
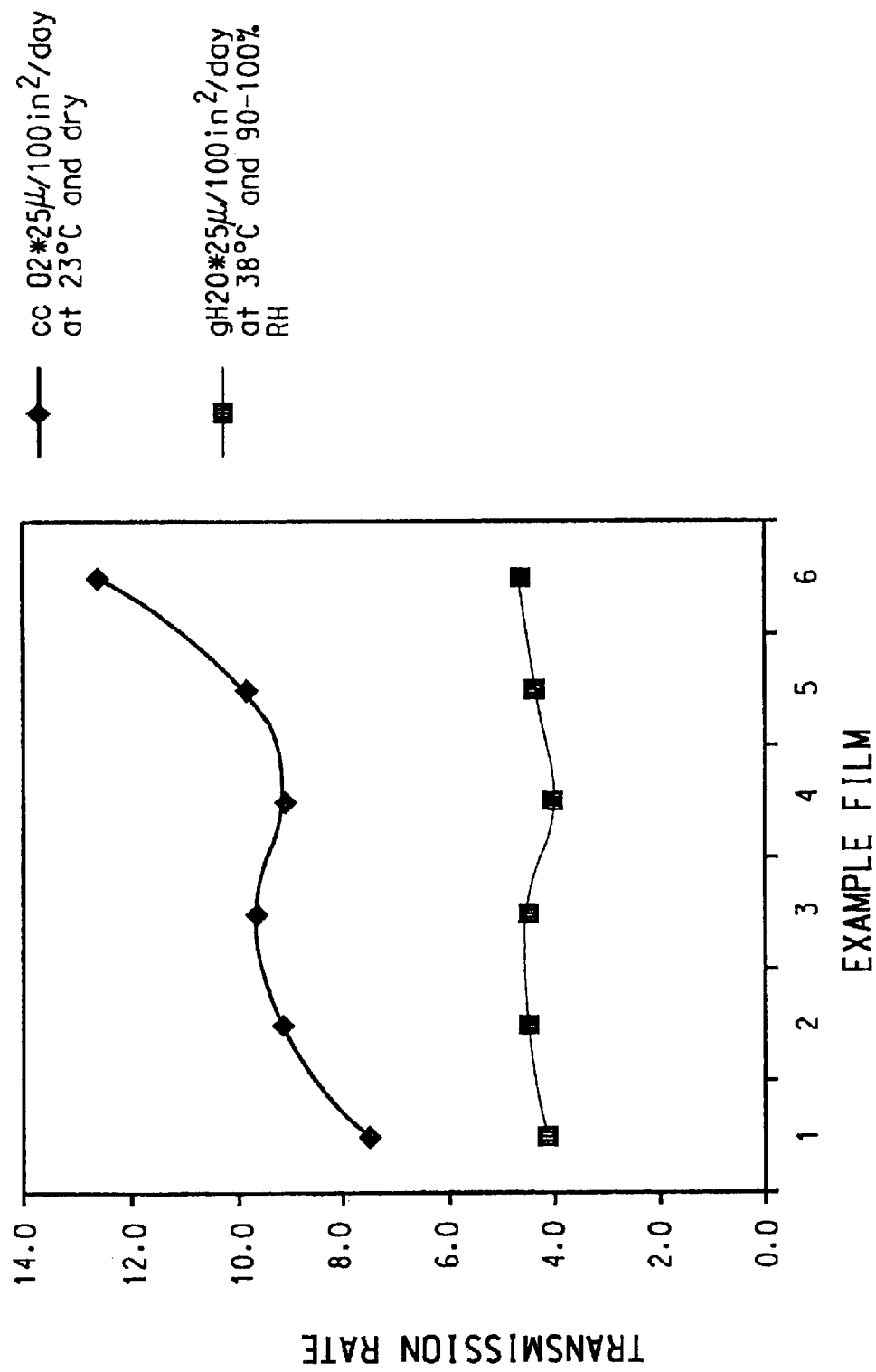
FIG. 3 is a graph showing the oxygen and moisture vapor transmission through monolayer cast films.

The test results in Table A and graphed in FIG. 3, indicate that oxygen transmission increases as 2GT-I is blended in with 3GT. The moisture vapor transmission rate remains about the same for all 6 test films.

Example films 1 to 6 were also used to measure the flavor permeability of the 3GT/2GT-I polymer blend. The method used was similar to ASTM E96. Seventy milliliters (58.6 grams) of d-limonene citrus flavorant (from Aromachem Inc.) was placed in each vapormeter cup, and a piece of test film was secured over the top of the cup with an o-ring. Five samples of each test film were tested to ensure the reliability of the results. Cups were placed in a 40° C. oven and measured each day over 27 days to determine the weight loss of flavorant. From these results a GMD value (gram*mil/(day*atm*100 $in^2$)) was calculated. In addition to the example films 1 to 6, comparison films made from nylon 6 (Allied Signal), and linear low density polyethylene (Dow Dowlex 2045) were included. Table B summarizes the flavor test results.

TABLE B

| Example Film | Permeation Value g * mil/(atm * day * 100 $in^2$) |
|---|---|
| 1 | 2.1 |
| 2 | 2.5 |
| 3 | 4.0 |
| 4 | 3.6 |
| 5 | 5.3 |
| 6 | 9.7 |
| Nylon 6 | 2.7 |
| LLDPE | 36.1 |

The test results in Table B, indicate blends of 3GT and 2GT-I provide a substantial improvement in flavor barrier compared to straight 2GT/I or LLDPE.

EXAMPLES 7–10

To overcome any physical aging phenomena (See, e.g., Physical aging in amorphous polymers and other materials, Struik, L. C. E., Amsterdam; N.Y.: Elsevier Scientific Pub. Co. distributors for the U.S. and Canada, Elsevier North-Holland, 1978) samples of higher molecular weight 2GT/I and 3GT were prepared by solid stating the starting 3GT or 2GT/I or by solid stating pellets produced by the melt blend of 2GT/I and 3GT. The following four resin samples illustrate the benefit of higher molecular weight on maintaining heat seal initiation and seal strength.

The two resins 2GT/I and 3GT that were used to prepare example films 1 to 6 were again dried, blended and then extruded through a 1/16" diameter strand die crash cooled in water and cut into 1/8" long pellets. The compositions of the four pellet blends (Example Resins 7 to 10) and the extrusion conditions are given in Table 7.

The four sets of extruded pellets were subsequently crystallized at 120° C. overnight in the desiccated hopper dryer system described above and then solid stated at 202° C. for 26 hours in a packed bed solid stator using a continuous flow of hot nitrogen. After 26 hours the resin was allowed to cool. The solid stated resin was analyzed to measure the solution viscosity. The solution viscosity values after solid stating are summarized in Table 8.

TABLE 7

Melt Blending and Pelletizing Blends of 3GT and 2GT/I

| Film Die Size | STRAND 1/16" Dia. | Die Lip Size | | |
|---|---|---|---|---|
| SCREEN SIZE - | 60-80-60/80-100-80 | | | |
| Example # | 7 | 8 | 9 | 10 |
| RESIN 1 | 3GT | 3GT | 3GT | 3GT |
| % WT | 60 | 40 | 20 | 70 |
| RESIN 2 | 2GT-I | 2GT-I | 2GT-I | 2GT-I |
| % WT | 40 | 60 | 80 | 30 |
| EXTRUDER CONDITIONS | Temp ° C. | Temp | Temp | Temp |
| Barrel Zone 1 | 260 | 285 | 285 | 260 |
| Barrel Zone 2 | 250 | 265 | 270 | 250 |
| Barrel Zone 3 | 240 | 265 | 265 | 240 |
| Barrel Zone 4 | 240 | 260 | 265 | 240 |
| Filter Flange - Die 1 | 240 | 250 | 265 | 240 |
| Adapter - Die 2 | 240 | 250 | 265 | 240 |
| Flat Die - Die 5 | 240 | 250 | 265 | 237 |
| Filter Melt | 237 | 251 | 260 | 236 |
| Adapter Melt | 241 | 250 | 265 | 241 |
| Filter - Pressure psi | 3010 | 1370 | 1410 | 3010 |
| Adapter - Pressure | 700 | 540 | 560 | 530 |
| Screw R.P.M. | 42 | 42 | 42 | 42 |
| Screw Amps | 3.2 | 2.6 | 2.6 | 3.0 |
| Thru-put (gm/min) | 92 | 101 | 100 | 93 |
| Thru-put (lb/hr) | 12.2 | 13.3 | 13.3 | 12.3 |

TABLE 8

Solution Viscosity Measurements on Example Resins 7 to 10 after Solid Stating for 26 hours at 202° C.

| Example Resin | IV |
|---|---|
| 7 | 1.31 |
| 8 | 1.22 |
| 9 | 1.12 |
| 10 | 1.38 |

To demonstrate the effectiveness of the solid state polymerized melt-blend resins 7, 8 and 10, three layer blown films were prepared with these example resins as the sealant layer, a DuPont Bynel® 3861 anhydride modified ethylene vinyl acetate resin as the tie layer and an HDPE (high density polyethylene, Chevron 9662) as the outside structural layer. The layer thickness were 1.7 mil HDPE
0.3 mil Bynel® 3861
0.5 mil Example Resin The 2.5 mil thick films were tested for heat seal strength and compared to three layer films with straight 3GT sealant layers. Heat seal conditions were 0.5 second dwell, 40 psi sealing bar pressure and 1" wide sealing bar. There was a slip sheet used for seal temperatures 275° F. and above.

Figure 4:
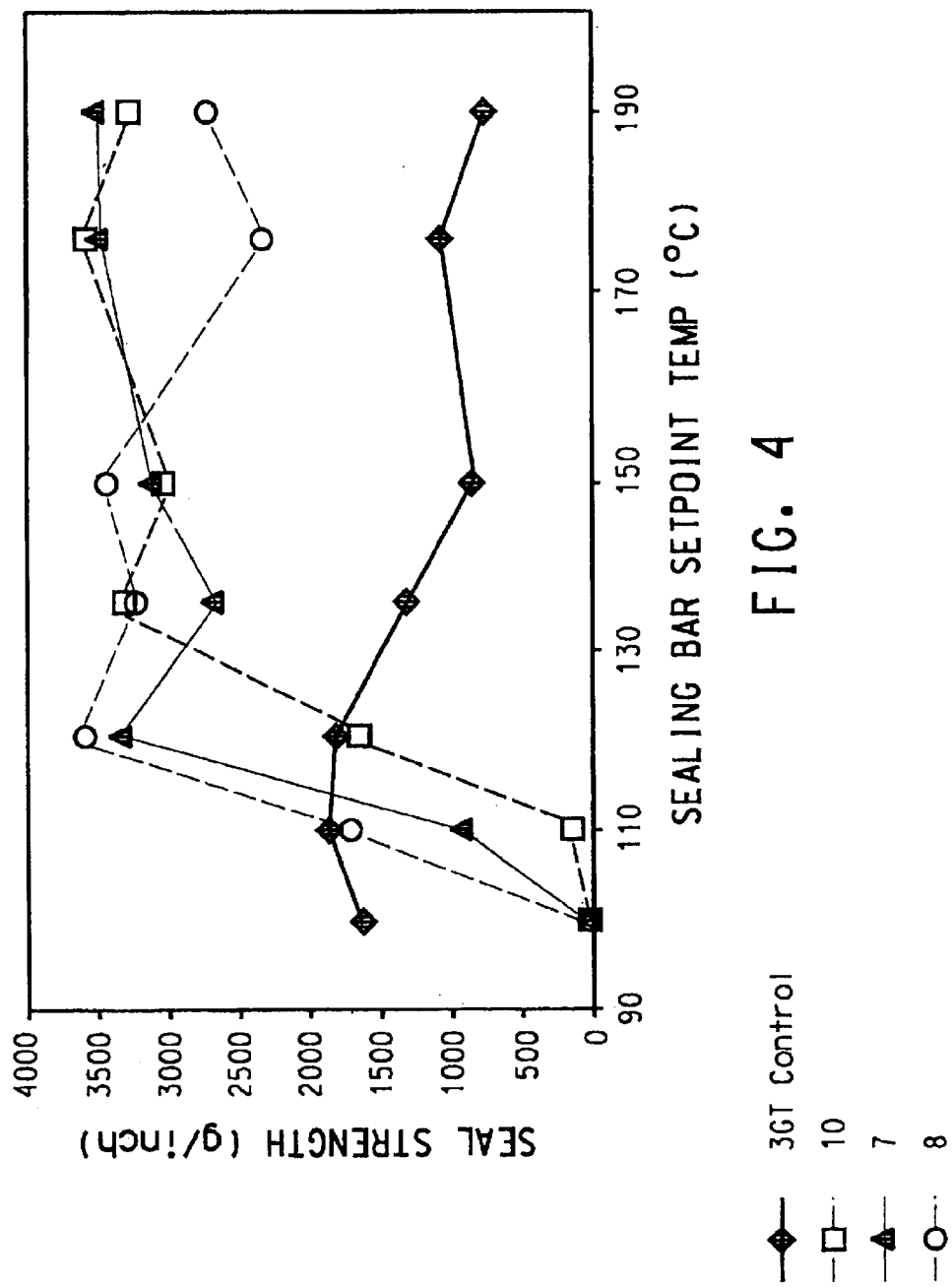
FIG. 4 is a graph showing the heat-seal strength v. sealing bar temperature for three-layer blown films "as made", i.e., films stored in moisture proof bags and heat sealed within one day of preparing films.
Figure 5:
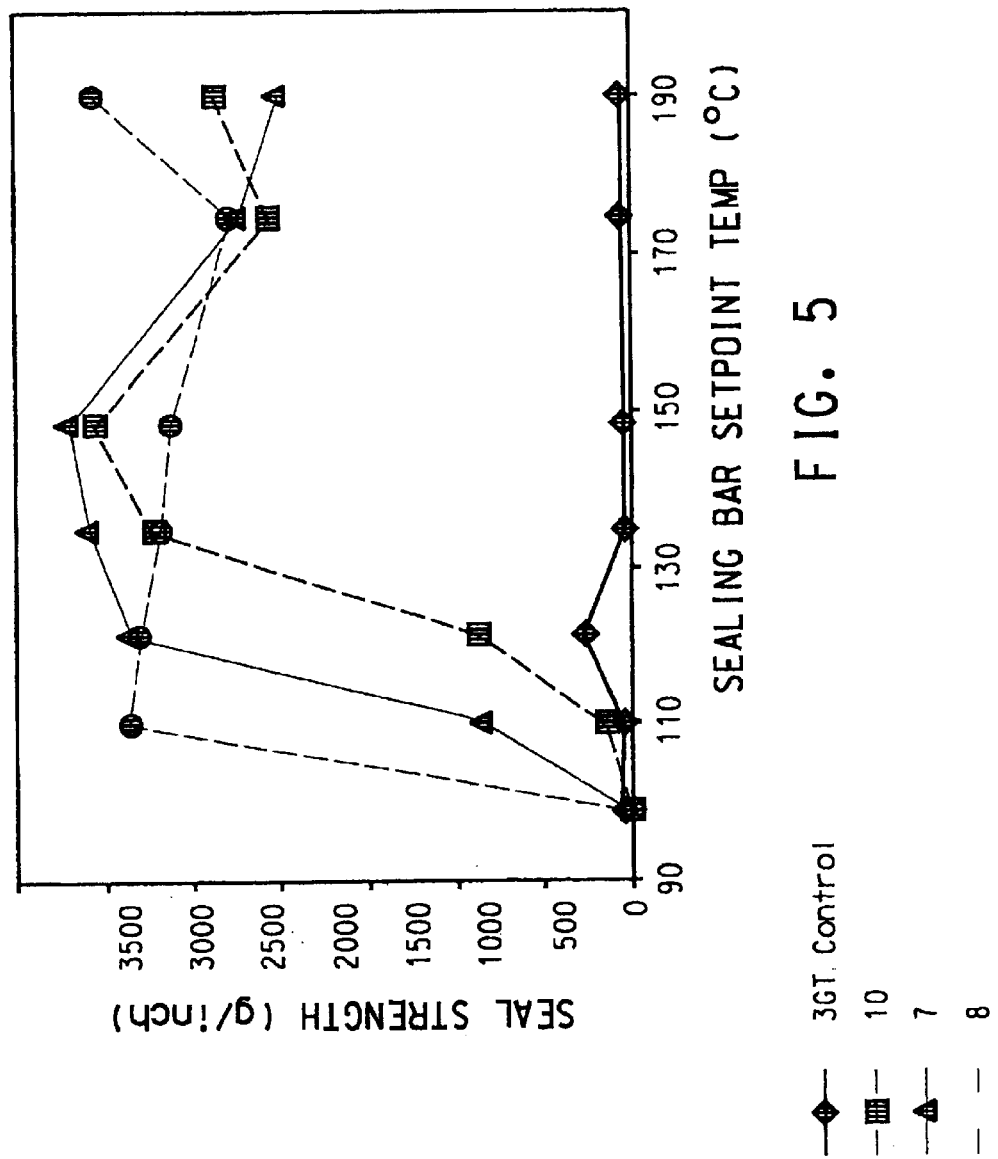
FIG. 5 is a graph showing the heat seal strength v. sealing bar setpoint temperature on films first aged for 24 hours at ambient conditions.

FIG. 4 Plots the Heat Seal Strength versus Sealing Bar Temperature for the "As Made Films". FIG. 5 Plots the Heat Seal Strength vs Sealing Bar Temperature for Films Sealed after 24 hours of ambient exposure.

One can see in FIG. 5, that the films made from the high molecular weight blend of 3GT and 2GT-I remain essentially unchanged in their heat seal properties by exposure for 24 hours to ambient conditions. On the other hand the film made from the 3GT control resin has poor heat seal strength over the temperature range studied.

EXAMPLE 11

These films demonstrate surprising results in "as made" low-temperature heat-seal strength and breadth of hot tack strength by making mono-layer cast film from solid state polymerized melt blends of 3GT resin with 2GT/I resin.
Preparation of Example Film 11:
Preparation of Melt Blend
Resin Drying;

Two polymers were dried separately. The first was a polyester copolymer of ethylene glycol, dimethyl terephthalate and isophthalic acid (2GT/I), with a melt point of 217° C. and a nominal IV of 0.68 [Selar™ PT 8307 polyester copolymer]. The second polymer was a homo-polymer of 1,3 propanediol and dimethyl terephthalate (3GT) with a melt point of 230° C. and a nominal IV of 1.1. The two polymers were individually dried overnight in a dessicated hot air dryer (dew-point less than −20° C. and dryer set-point of 125° C.).
Pellet/Pellet Blends;

After drying, pellet to pellet blends of 2GT/I and 3GT were prepared by mixing the resins in a 20 liter volume plastic pail.
Melt Blending;

The dried pellet/pellet blend was fed to a 31 mm (1¼") diameter Wayne 30/1 L/D single screw extruder fitted with a 1.56 mm (¹⁄₁₆") diameter strand die and water quench tank and pelletizer. The Wayne extrusion conditions for the 30% 3GT/70% 2GT-I are given in Table 9.

TABLE 9

| Resin For Example Film 11 | | |
|---|---|---|
| RESIN | PT 8307 | |
| % WT | 70 | |
| RESIN | 3GT | |
| % WT | 30 | |
| EXTRUDER CONDITIONS ° C. | Temp Set | Temp Act |
| Barrel Zone 1 | 220 | 220 |
| Barrel Zone 2 | 240 | 241 |
| Barrel Zone 3 | 240 | 241 |
| Barrel Zone 4 | 240 | 240 |
| Filter Flange - Die 1 | 230 | 230 |
| Adapter - Die 2 | 230 | 233 |
| STRAND Die 3 | 230 | 229 |
| Filter Melt | 233 | |
| Adapter Melt | 230 | |
| Filter - Pressure | 1420 | |
| Adapter - Pressure | 790 | |
| Screw R.P.M. | 42 | |
| Screw Amps | 3.2 | |
| Thru-put (gm/min) | 109.20 | |
| Thru-put (lb/hr) | 14.414 | |

The melt blended resin was subsequently crystallized at 120° C. overnight in the desiccated hopper dryer system described above and then solid stated at 195° C. for 5 hours in a packed bed solid stator using a continuous flow of hot nitrogen. After 5 hours the resin was allowed to cool.

Film Analysis;

The solid stated melt blend (comprised of 30 wt % 3GT and 70 wt % 2GT-1) was used to cast nominally 37 micron thick (0.0015") film using the same mono-layer cast film set-up described above. Prior to casting into film the solid stated resin was dried at 130° C. overnight. Film casting conditions used to prepare example film 11 are given in Table 10. The solution viscosity measurement (using procedures described above) measured an IV on Example film 11 of 0.985.

TABLE 10

Solid Stated Melt Blend
of 30 wt % 3GT/70 wt % 2GT-I
Example Film 11

| EXTRUDER CONDITIONS ° C. | Temp Act |
|---|---|
| Barrel Zone 1 | 287 |
| Barrel Zone 2 | 280 |
| Barrel Zone 3 | 271 |
| Barrel Zone 4 | 271 |
| Filter Flange - Die 1 | 270 |
| Adapter - Die 2 | 270 |
| Feed Block - Die 3 | 273 |
| End Flanges - Die 4 | 271 |
| Flat Die - Die 5 | 270 |
| Filter Melt | 262 |
| Adapter Melt | 269 |
| Filter - Pressure | 2220 |
| Adapter - Pressure | 840 |
| Screw R.P.M. | 40 |
| Screw Amps | 2.7 |
| CASTING UNIT | |
| Casting Roll - F.P.M. | 45 |
| Haul Off Roll - ratio to cast roll | 1.0 |
| Bowed Roll - ratio to cast roll | 1.0 |
| Edge Pinners - PSI | YES |
| Slitter Blades - PSI | NO |
| Haul Off Roll Nip - PSI | 50 |
| Film Gauge (mls) | 2.70 |
| Layflat (in) | 5.13 |
| Thru-put (gm/min) | 97.10 |
| Thru-put (lb/hr) | 12.817 |
| Paper/Brake PSI | |
| Film sample Y?N | YES |
| Comments | |
| H2O Recirculation Unit | |
| Temperature Set/Act | 60 |
| Supply Pres/Temp | 60 |
| Return Pres/Temp | 25 |
| Winder % psi | 70 |

The monolayer cast film labeled Example Film 11 was used to measure the heat seal properties. The lowest sealing bar temperature at which strong seals occur is of interest because low heat seal initiation implies less heat is required to generate a seal. Less heat means lower sealing bar temperatures can be used which extends the sealing jaw life (reduces maintenance costs) and also correlates top faster line speeds because seals occur faster. Heat seals were measured following ASTM procedure F88, using a 12.5 μm (0.5 mil) Mylar® film slip sheet, a 40 psi sealing bar pressure, a 0.64 cm (0.25") wide sealing bar, and a 1.0 sec dwell. Heat was applied to the upper bar only. The resulting seal strengths were measured on 0.5" wide sealed strips using an SP-102C-3 m90 Slip/Peel tester Supplied by IMASS, Inc. Box 134 Accord Mass. 02018-0134 at 10"/minute cross head speed.

The heat seal strength example film 11 is summarized in Table 11.

TABLE 11

Heat Seal Strength for Example film 11.
Units of seal strength are gm/0.5 in.

| Bar Setpoint Temp° C. | Example 11 |
|---|---|
| 90 | 0 |
| 100 | 13 |
| 110 | 359 |
| 120 | 1537 |
| 130 | 2000 |
| 140 | 2000 |

The following addition examples are presented to further illustrate specific features and embodiments of the present invention including a first set of examples related to cast films and a second set of examples related to coextruded films. As such the following examples are not intended to be unduly limiting.

EXAMPLE SET A TO M

Heat-Sealable Monolayer Cast Films:

In order to illustrate the need for elevated melt temperatures and extended hold-up time to make amorphous heat seal-able polyester films, several cast films were prepared from pellet blends comprising at least one copolyester made with the co-monomer 1,3 propanediol. In all cases the cast films were conditioned for 24 hour at 23±1° C. and 50% relative humidity (RH) after which the films were heat sealed at various sealing bar temperatures. The average peak seal strength of the seal was measured.

The films were made from pellet blends of the following polyester resins:

A nominally 0.91 IV solid stated copolyester resin made from 1,2 ethanediol, terephthalic acid and a minor amount of isophthalic acid. The polymer is sold by DuPont Polyester Resins and Intermediates and branded as Melinar™ N4009 polyester resin. The peak melting point of this co-polyester was 244° C. as measured by a TA Instruments Differential Scanning Calorimeter (DSC) using a 110° C./min heating rate according to ASTM D3417 using a three point calibration with Indium, Tin and Zinc. This polymer will be referred to as 2GT-I (0.91 IV).

A nominally 1.04 IV solid stated polyester homopolymer made from 1,3 propanediol, and dimethyl terephthalate. The polymer is sold by DuPont as Sorona™ 3GT polyester. The peak melting point of this homopolymer was 228° C. as measured by the DSC procedure described above. This polymer will be referred to as 3GT (1.04 IV).

A nominally 0.95 IV polyester homopolymer made from 1,2 ethanediol and dimethyl terephthalate. The polymer was sold by DuPont as Selar™ PT X295 polyester resin. The peak melting point of this homopolymer was 249° C. as measured by the DSC procedure described above. This resin will be referred to as 2GT (0.95 IV).

Prior to casting into film, the resins were dried overnight using a desiccated hopper dryer system where the set-point temperature for the dryer was 121° C. (250° F.). The dried resins were then blended together into 3000-gram batches by weighing the appropriate ratios into a 20-liter pail and vigorously hand mixing for 2 minutes.

The blended pellets were immediately fed to the nitrogen swept hopper of a 32 mm (1¼ inch) diameter 30/1 length to diameter (L/D) single screw extruder fitted with a 3/1 compression ratio, single flighted screw with 5 L/D of a melt mixing section. The flight depth in the feed section was 5.3 mm (0.20 inch). The extruder die was a 152 mm (6 inch) wide coat hanger type flat film die with a 0.25 mm (0.010 inch) die gap. Wayne Machine 100 Furler St. Totowa N.J. 07512-1896 built the extruder and die. The molten polymer exiting from the die drawn down to nominally 38 μm (0.0015 inch) thick film as it was cast onto an 203 mm (8 inch) wide, by 203 mm (8 inch) diameter rotating double shell spiral baffle casting roll fitted with controlled temperature cooling water. In all cases an 80/100/80 US mesh screen combination supplied by Niagara Screen Products was used to filter the polymer melt. The screens were held in place by the breaker plate. Killion Extruders—Davis Standard 200 Commerce Road, Cedar Grove N.J. 07009, built the casting roll. The film was cast onto the chill roll. A stream of air (534 kPa supply pressure) directed through a jet orifice was used to pin the outside edges of the film to the cast roll.

Figure 6:
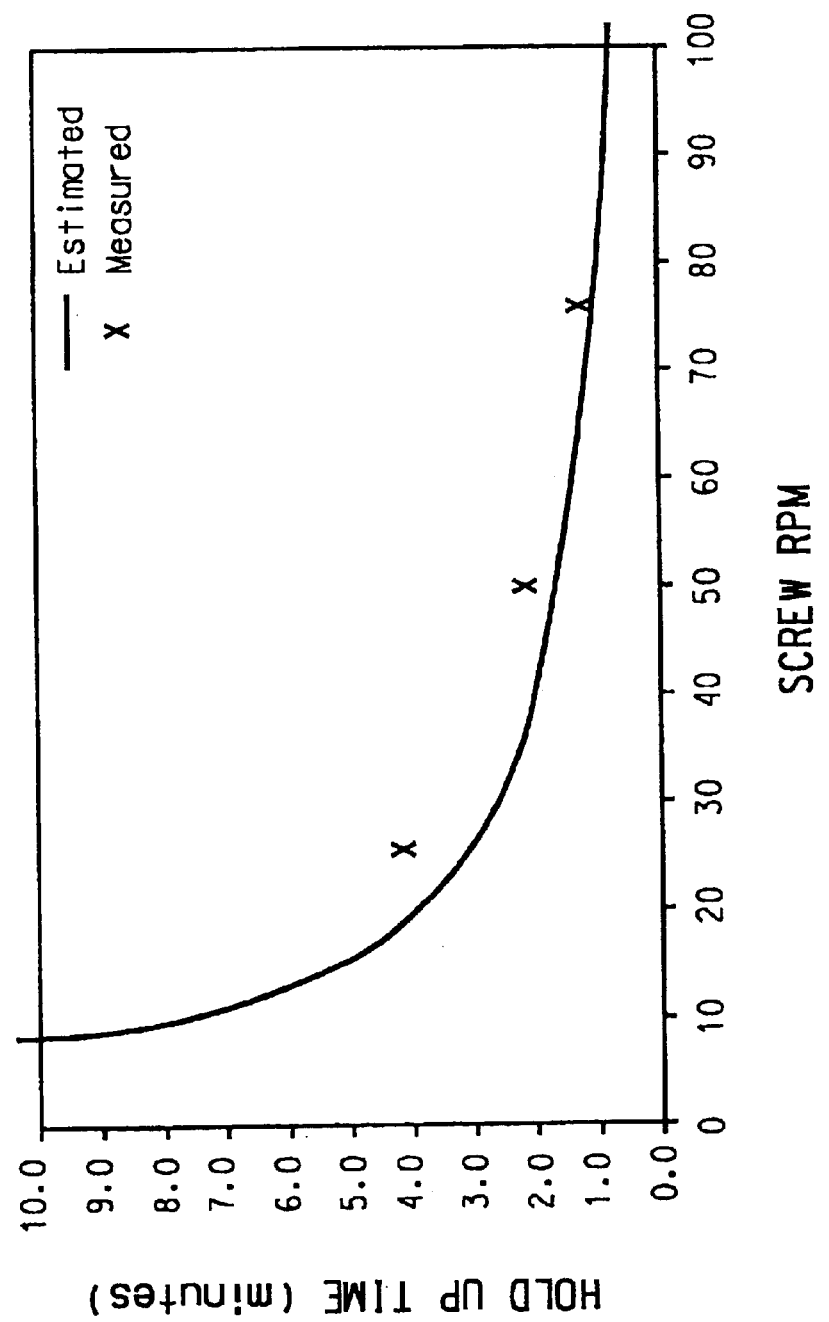
FIG. 6 is a graph comparing estimated and measured hold-up times as a function of screw rpm on a 32 mm (1¼ inch) diameter cast film extruder and die.

The quenched cast film was wound onto a 76 mm (3 inch) diameter paper core and stored in a polyethylene bag. A summary of the blend compositions has been provided in Table 12. Table 13a, 13b and 13c summarize the extruder and casting roll operating conditions. In Tables 13a through 13c, two melt temperatures are reported, the polymer melt temperature before the filter and the polymer melt temperature in the adapter. The filter melt probe was mounted flush to the edge of the polymer melt channel in the flange and is more a measure of the temperature of the steel flange than it is and indication of the polymer melt. The adapter melt temperature was recorded using a melt probe that extended to the center of the 6.1 mm (¼ inch) diameter adapter melt transfer line. In Tables 13a, 13b and 13c the reported throughput in grams per minute was calculated by weighing a sample of the extruded film that was collected during extrusion for a 30-second sample period. The hold-up time was also calculated by dropping a color concentrate pellet onto the almost bare flight of the feed screen and then recording the time that would elapse prior to first glimpse of color appearing in the extruded film. This technique has some drawbacks in terms of how long it actually takes the pellet to be conveyed away from the feed throat. The technique assumes the pellet is instantaneously conveyed but that is probably unlikely. The reported hold-up time probably has a bias towards overstating the hold up time. FIG. 6 is a plot of the measured hold-up time, and estimated hold-up time (based on geometry) versus screw speed for the 32 mm (1¼ inch) diameter 30/1 L/D Wayne Extruder fitted with adapter and 152 mm (6 inch) wide flat film die.

TABLE 12

Blend Compositions used to Cast Film

| Resin Blend | 3GT | gms | 2GT-I (0.91) | Gms | 2GT (0.95) | gms |
|---|---|---|---|---|---|---|
| Resin Blend 1 | 70% | 2100 | 30% | 900 | | |
| Resin Blend 2 | 50% | 1500 | 50% | 1500 | | |
| Resin Blend 3 | 50% | 1500 | | | 50% | 1500 |

TABLE 13a

Monolayer Film Casting Operating Conditions

| | | | | |
|---|---|---|---|---|
| O.I. # | 2699-088 | 2699-088 | 2699-088 | 2699-093 |
| RUN Ident. # | 1 | 2 | 3 | 1 |
| Example Film | A | B | C | D |
| DATE | Nov. 14, 2000 | Nov. 14, 2000 | Nov. 14, 2000 | Nov. 21, 2000 |
| Resin Blend | 1 | 2 | 3 | 1 |
| EXTRUDER CONDITIONS | Temp Act | Temp Act | Temp Act | Temp Act |
| Barrel Zone 1 (° C.) | 275 | 275 | 275 | 275 |
| Barrel Zone 2 | 270 | 270 | 300 | 270 |
| Barrel Zone 3 | 265 | 265 | 300 | 264 |
| Barrel Zone 4 | 265 | 265 | 300 | 265 |
| Filter Flange - Die 1 | 265 | 265 | 265 | 265 |
| Adapter-Die 2 | 265 | 270 | 270 | 266 |
| Feed Block-Die 3 | 232 | 257 | 263 | 258 |
| End Flanges-Die 4 | 260 | 267 | 270 | 265 |
| Flat Die-Die 5 | 269 | 265 | 265 | 265 |
| Melt at Filter (° C.) | 259 | 259 | 275 | 259 |
| Melt at Adapter (° C.) | 265 | 270 | 277 | 269 |
| Pressure before Filter (kPa) | 9308 | 10919 | 5281 | 8682 |
| Pressure after Filter (kPa) | 4475 | 5281 | 2148 | 3849 |
| Screw R.P.M. | 50 | 50 | 25 | 50 |
| Screw Amps | 2.6 | 2.7 | 2.3 | 2.7 |
| Casting Roll Linear Speed meter per minute | 19.8 | 18.3 | 13.7 | 18.3 |
| Speed Ratio Haul Off Roll/Cast Roll | 1.02 | 1.02 | 1.02 | 1.02 |
| Ratio Bowed Roll/Cast Roll | 1 | 1 | 1 | 1 |
| Average Film Gauge (μm) | 39.0 | 44.1 | 45.7 | 42.8 |
| Thru-put (gm/min) | 130 | | | 130 |
| Chill Roll Temperature Act (° C.) | 18 | 18 | 18 | 13 |
| Hold Up Time | 2.3 min | 2.3 min | 4.2 min | 2.3 min |

TABLE 13b

Monolayer Film Casting Operating Conditions

| O.I. # | 2699-093 | 2699-093 | 2699-093 | 2699-093 |
|---|---|---|---|---|
| RUN Ident. # | 2 | 3 | 4 | 5 |
| Example Film | E | F | G | H |
| DATE | Nov. 21, 2000 | Nov. 21, 2000 | Nov. 21, 2000 | Nov. 21, 2000 |
| Resin Blend | 1 | 1 | 1 | 2 |
| EXTRUDER CONDITIONS | Temp Act | Temp Act | Temp Act | Temp Act |
| Barrel Zone 1 (° C.) | 275 | 275 | 275 | 275 |
| Barrel Zone 2 | 270 | 300 | 300 | 300 |
| Barrel Zone 3 | 264 | 299 | 300 | 300 |
| Barrel Zone 4 | 265 | 300 | 300 | 300 |
| Filter Flange - Die 1 | 265 | 265 | 265 | 265 |
| Adapter-Die 2 | 265 | 271 | 270 | 271 |
| Feed Block-Die 3 | 263 | 269 | 270 | 270 |
| End Flanges-Die 4 | 266 | 269 | 270 | 270 |
| Flat Die-Die 5 | 265 | 270 | 266 | 269 |
| Melt at Filter (° C.) | 256 | 282 | 276 | 283 |
| Melt at Adapter (° C.) | 266 | 284 | 277 | 283 |
| Pressure before Filter (kPa) | 4475 | 5818 | 2775 | 6981 |
| Pressure after Filter (kPa) | 985 | 2148 | 90 | 3133 |
| Screw R.P.M. | 25 | 50 | 26 | 50 |
| Screw Amps | 2.4 | 2.4 | 2.2 | 2.5 |
| Casting Roll Linear Speed meter per minute | 10.7 | 18.3 | 12.2 | 19.8 |
| Speed Ratio Haul Off Roll/Cast Roll | 1.02 | 1.02 | 1.02 | 1.02 |
| Ratio Bowed Roll/Cast Roll | 1 | 1 | 1 | 1 |
| Average Film Gauge (μm) | 45.6 | 48.8 | 49.8 | 48.1 |
| Thru-put (gm/min) | 62 | 142 | 74 | 136 |
| Temperature Set/Act (° C.) | 13 | 13 | 13 | 13 |
| Hold-Up Time (min) | 4.2 | 2.3 | 4.2 | 2.3 |

TABLE 13c

Monolayer Film Casting Operating Conditions

| O.I. # | 2699-093 | 2699-093 | 2699-113 | 2699-113 | 2699-126 |
|---|---|---|---|---|---|
| RUN Ident. # | 6 | 7 | 1 | 8 | 1 |
| Example Film | I | J | K | L | M |
| DATE | Nov. 21, 2000 | Nov. 21, 2000 | Dec. 7, 2000 | Dec. 7, 2000 | Jan. 3, 2001 |
| Resin Blend | 2 | 2 | 2 | 2 | 2 |
| EXTRUDER CONDITIONS | Temp Act | Temp Act | Temp Act | Temp Act | Temp Act |
| Barrel Zone 1 (° C.) | 275 | 275 | 275 | 275 | 275 |
| Barrel Zone 2 | 300 | 300 | 270 | 300 | 270 |
| Barrel Zone 3 | 300 | 301 | 265 | 300 | 265 |
| Barrel Zone 4 | 300 | 300 | 265 | 300 | 265 |
| Filter Flange - Die 1 | 265 | 265 | 265 | 265 | 265 |
| Adapter - Die 2 | 270 | 271 | 270 | 272 | 270 |
| Feed Block - Die 3 | 269 | 270 | 260 | 265 | 256 |
| End Flanges - Die 4 | 270 | 270 | 270 | 270 | 270 |
| Flat Die - Die 5 | 265 | 272 | 265 | 268 | 265 |
| Melt at Filter (° C.) | 276 | 285 | 259 | 282 | 259 |
| Melt at Adapter (° C.) | 277 | 289 | 272 | 283 | 272 |
| Pressure before Filter (kPa) | 3580 | 9487 | 10919 | 7787 | 10024 |
| Pressure after Filter (kPa) | 627 | 5370 | 5997 | 4296 | 5639 |
| Screw R.P.M. | 25 | 75 | 50 | 51 | 50 |
| Screw Amps | 2.3 | 2.5 | 2.9 | 2.5 | 2.6 |
| Casting Roll Linear Speed mpm | 10.7 | 29.0 | 18.3 | 18.3 | 19.8 |
| Speed Ratio Haul Off Roll/Cast Roll | 1.02 | 1.02 | 1.03 | 1.03 | 1.03 |
| Speed Ratio Bowed Roll/Cast Roll | 1 | 1 | 1 | 1 | 1 |
| Average Film Gauge (μm) | 52.6 | 44.3 | 40.6 | 42.0 | 37.6 |
| Thru-put (gm/min) | 76 | 218 | 128 | 140 | 106 |
| Temperature Set/Act (° C.) | 13 | 13 | 13 | 13 | 13 |
| Hold-Up Time (min) | 4.2 | 1.4 | 2.3 | 2.3 | 2.3 |

FIG. 6 compares the estimated hold-up time in minutes to the measured hold-up time as a function of screw rpm on 32 mm (1¼ inch) diameter cast film extruder and die employed from essentially 10 to 100 rpm.

Immediately after casting the film the rolls were stored in 80 to 100 micron thick polyethylene bags sealed with twist ties or tape for future analysis.

In the case of sample films A through J and M, on the same day they were cast into film, approximately 2 meter lengths of film were removed from the polyethylene bag and laid out for 24 hours of exposure in a temperature and humidity controlled lab (23±1° C. and 50% RH). In the case of sample films K and L, they were stored in the plastic bags at ambient conditions for 4 days and then samples were removed from the bags for 24 hours of conditioning at 23+1° C. and 50% RH. Immediately following the 24 hour exposure, the films were heat sealed together to form fin seals. Sealing bar set-point temperatures were from 90 to 130° C. in 10° C. increments. Heat seals were prepared using a Sencorp Systems (Hyannis Mass. USA 02601) Model 12ASL/1 heat sealer. Sealing conditions were a 12.5 μm (0.5 mil) DuPont Mylar® film slip sheet, a 358 kpa (40 psi) sealing bar pressure, a 2.5 cm (1.0 inch) wide by 30.5 cm (12½ inch) long sealing bar, and a 0.5 second dwell. Heat was applied to the upper bar only. The lower, unheated bar comprised a 2.5 cm wide by 30.5 cm long piece of red rubber in a steel holder. Following ASTM procedure F88, coupons 25.4 mm wide by 70 to 100 mm long were die cut from the sealed films to test the strength of the seals. In all cases the orientation of the fin seal was in the transverse direction. The 25.4 mm wide seals were pulled in the MD direction using an Instron model 4469 with a 50.8 mm (2 inch) initial jaw separation, 25.4 cm/min (10 inch/min) jaw separation rate with ambient conditions of 23±1° C. and 50% RH. The tail was held by hand to ensure a 90° orientation of tail to direction of pull. Generally four coupons were tested at each sealing bar set-point temperature. The average peak seal strength is reported in Table 14 for sample films A through M.

TABLE 14

Average "Peak" Seal Strength (gm/2.54 cm)

Seal Bar Set-Point Temp (° C.)

| Example Film | 90 | 100 | 110 | 120 | 130 |
|---|---|---|---|---|---|
| A | 0 | 0 | 0 | 0 | 0 |
| B | 0 | 21 | 168 | 72 | 237 |
| C | 0 | 77 | 1402 | 1700 | 2344 |
| D | 0 | 0 | 0 | 0 | 0 |
| E | 0 | 0 | 0 | 0 | 0 |
| F | 0 | 0 | 0 | 0 | 357 |
| G | 0 | 151 | 550 | 704 | 803 |
| H | 0 | 0 | 1590 | 1880 | 2166 |
| I | 0 | 157 | 1607 | 2651 | 2744 |
| J | 0 | 55 | 1442 | 1232 | 1891 |
| K | 0 | 325 | 422 | 1106 | 844 |
| L | 0 | 536 | 1464 | 1419 | 2034 |
| M | 0 | 0 | 0 | 0 | 133 |

The average Peak seal strength values, reported in Table 14, show that none of the 13 samples tested had any seal strength at a 90° C. sealing bar set-point temperature. Some of the samples had seal strengths at 100° C. seal bar set-points and higher.

A process model was developed to understand why some of the films sealed easily making strong seals of greater than 1,000 grams/2.54 cm (grams/inch) between 110 and 130° C. seal bar set-points. Using the tabulated process conditions and average seal strength values at 100 and 120° C. seal bar seal set-point temperatures for example Films A through J (See Table 15) a process model was developed.

The three process factors were:

x3GT—the fraction 3GT in the 3GT/2GT or 3GT/2GT-I blend

HUT—the hold-up time in the extrusion process

MT—the adapter melt temperature in the extrusion process.

TABLE 15

Process and Conditions Ave. Seal Strength at 110° C. and 120° C. for Example Films A to J

| Example Film | x3GT | MT | HUT | 110° C. gm/2.5 cm | 120° C. gm/2.5 cm |
|---|---|---|---|---|---|
| A | 0.7 | 265 | 2.3 | 0 | 0 |
| B | 0.5 | 270 | 2.3 | 168 | 72 |
| C | 0.5 | 277 | 4.2 | 1402 | 1700 |
| D | 0.7 | 269 | 2.3 | 0 | 0 |
| E | 0.7 | 266 | 4.2 | 0 | 0 |
| F | 0.7 | 284 | 2.4 | 0 | 0 |
| G | 0.7 | 277 | 4.2 | 550 | 704 |
| H | 0.5 | 283 | 2.4 | 1590 | 1880 |
| I | 0.5 | 277 | 4.2 | 1607 | 2651 |
| J | 0.5 | 289 | 1.4 | 1442 | 1232 |

The model indicated a strong correlation existed between the average seal strength at 110° C. and 120° C. and three factors Process Model;

The above three factors were normalized for the Wayne Extrusion process model using the following relation.

NX3GT=(x3GT−0.6)/(0.1)

NMT=(MT-275.7)/12

NHUT=(HUT-3)/1.4

The model also included interaction factors

NX3GT*NMT

NX3GT*NHUT

NMT*NHUT

Process Model to Predict Seal Strength at 110° C. bar temperature;

For Seal Strength at 110° C., the full parameter model was:

| NMT * NHUT | Nx3GT * NHUT | Nx3GT * NMT | NHUT | NMT | Nx3GT | B |
|---|---|---|---|---|---|---|
| 504 | −10.9 | −630 | 400 | 831 | −395 | 557 |

The correlation coefficient=0.99

Standard Error of Estimate of Seal Strength 92 g/in

With very little loss in accuracy, the model for seal strength at 110° C. can be reduced to just five parameters.

Reduced Process model for seal strength at 110° C. the five parameter model was;

| x3GT * MT | HUT | MT | x3GT | b |
|---|---|---|---|---|
| −417 | 382 | 556 | −428 | 554 |

The correlation coefficient=0.94
Standard Error of estimate of the seal strength on this 5-parameter model for 110° C. seal strength was 250 g/2.54 cm.
Process Model To Predicted Seal Strength at 120° C. Seal Bar Set-point: For seal strength at the 120° C. seal bar set-point the full response model was;

| MT * HUT | x3GT * HUT | x3GT * MT | HUT | MT | x3GT | b |
|---|---|---|---|---|---|---|
| 701 | −172 | −759 | 689 | 1025 | −493 | 703 |

The correlation coefficient for this full model was=0.94
Standard Error of estimate for the full model at 120° C. seal strength was 400 g/2.54 cm.
To illustrate the effectiveness of this model, Table 5 summarizes the predicted, measured and error between the predicted and actual seal strength values at 110 and 120° C. for all 13 example films A through M. A negative seal strength value has no meaning and should probably be interpreted as zero.

TABLE 16

Comparison of Actual and Predicted Seal Strengths[1] at 110 and 120° C. seal bar set-point temperature based on fraction 3GT, Adapter Melt Temperature and Extrusion Hold Up Time

| Example Film | Actual 110° C. | predicted 110° C. | error 110° C. | actual 120° C. | Predicted 120° C. | error 120° C. |
|---|---|---|---|---|---|---|
| A | 0 | 12 | −12 | 0 | 26 | −26 |
| B | 168 | 174 | −6 | 72 | 88 | −16 |
| C | 1402 | 1513 | −111 | 1700 | 2198 | −498 |
| D | 0 | −3 | 3 | 0 | 0 | 0 |
| E | 0 | −17 | 17 | 0 | −47 | 47 |
| F | 0 | −9 | 9 | 0 | −28 | 28 |
| G | 550 | 567 | −17 | 704 | 752 | −48 |
| H | 1590 | 1539 | 51 | 1880 | 1738 | 142 |
| I | 1607 | 1513 | 94 | 2651 | 2198 | 453 |
| J | 1442 | 1471 | −29 | 1232 | 1312 | −80 |
| K | 422 | 376 | 46 | 1106 | 328 | 778 |
| L | 1464 | 1488 | −23 | 1419 | 1646 | −227 |
| M | 0 | 376 | −376 | 0 | 328 | −328 |

[1]Seal Strength's are expressed in grams/2.54 cm.

Process Optimization
Given the relatively good predictive power of the process model, it is possible to delineate the processing conditions that will produce the best sealing performance
Increase the melt temperature.
Increase the hold-up time
Reduce the fraction 3GT to 50%
To illustrate the relationships, consider that at a 270° C. adapter melt temperature long hold-up times will be required to produce a film that will have strong seals. The model predicts that using 50% 3GT fraction and a 270° C. adapter melt temperature, 9 minutes of hold-up time would be required to achieve an average peak seal strength of 1,000 g/2.5 cm. By increasing the adapter melt temperature to 285° C., the model predicts the same 1,000 g/2.5 cm of seal can be achieved at 1.1 minute of hold-up time. At a 70% 3GT fraction in the 3GT/2GT blend and a 285° C. adapter melt temperature, the model predicts 4.3 minutes of hold-up time will be required to achieve the 1000 g/2.5 cm of seal strength.

There are practical constraints on hold-up time, and adapter melt temperature. For instance in terms of hold-up time there are limits imposed by pressure drop, shear rate and equipment fabrication costs that may prevent the use of long transfer lines and or adapters necessary to achieve long hold-up times in excess of 10 to 15 minutes. Also the thermal stability of the polyester resin or in the case of multi-layer co-extruded films that may prevent melt temperatures in excess of 300° C.

Figure 7:
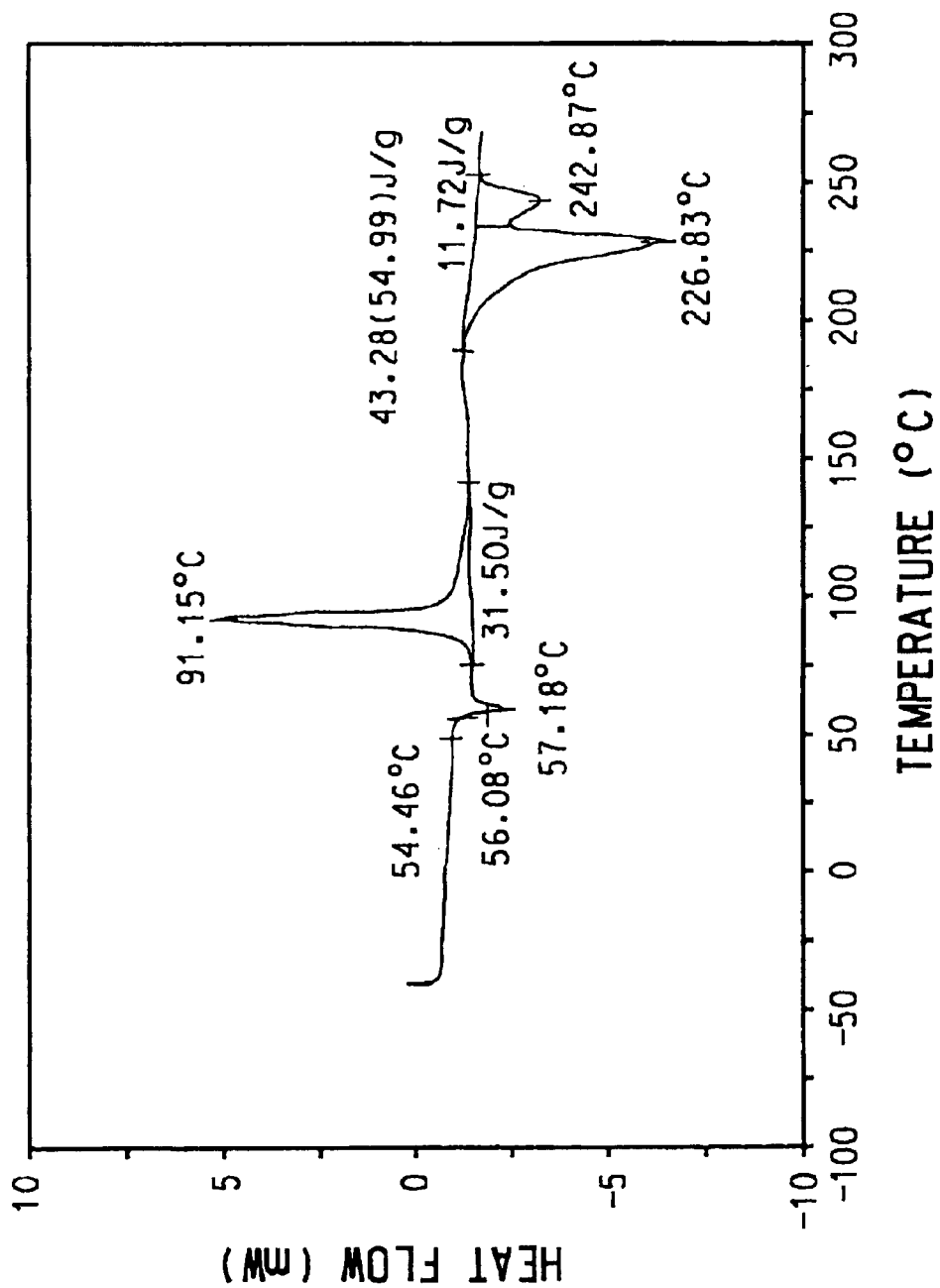
FIG. 7 is a first pass differential scanning calorimeter, DSC, plot for cast film of Example A from –40 to 270° C. at a scan rate of 10° C. per minute.
Figure 8:
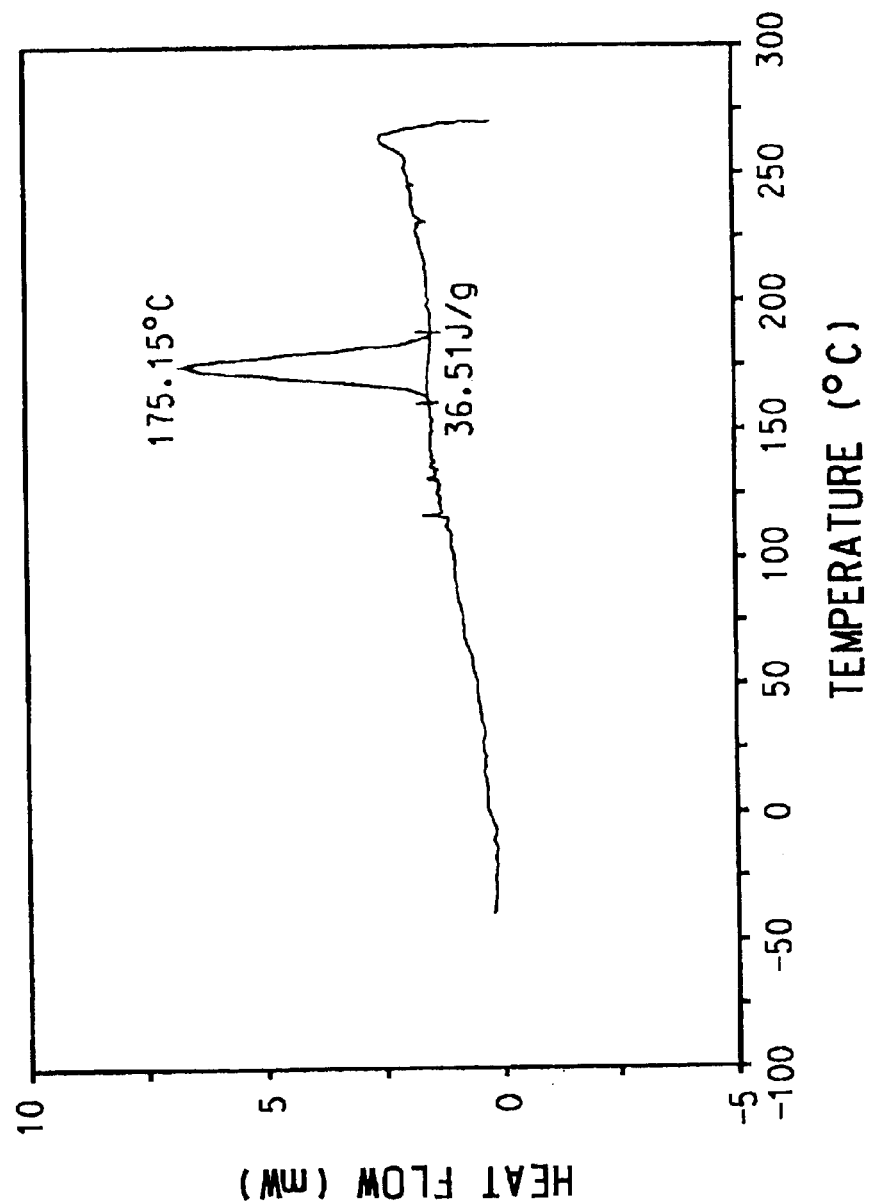
FIG. 8 is the DSC cooling curve for cast film of Example A from 270 to –40° C. at a scan rate of 10° C. per minute
Figure 9:
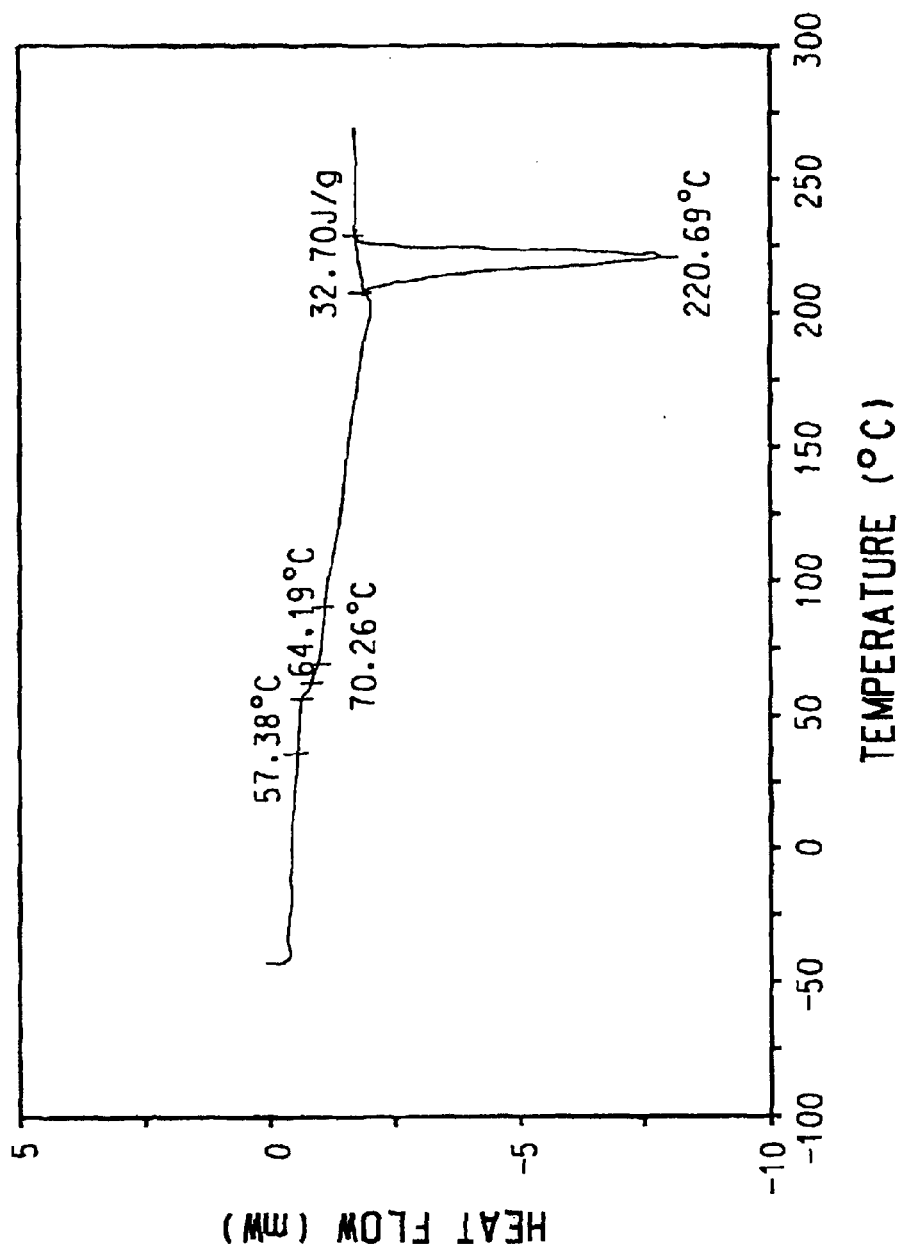
FIG. 9 is a second heat DSC for cast film of Example A from –40 to 270° C. at a scan rate of 11° C. per minute

Thermal Analysis of Mono-Layer Cast Films:
All of the 13 mono-layer cast films were analyzed by DSC to determine the peak melting points (ASTM D3417) and transitions (ASTM D3418). FIGS. 7, 8 and 9 show the three-pass DSC profile for Example Film A. FIG. 7 represents the first pass DSC on Example Film A from −40 to 270° C. at 10° C./minute. On this first heat profile, the inflections and peak of interest are:

The Tg represents the glass transition temperature. Amorphous (non-crystalline) polyester films or articles will not form heat seals with themselves until the temperature of the two seal-forming surfaces are raised above the glass transition. On the first heat the Tg shows up as an inflection in the heat required to maintain a constant heating rate of the film. The mid-point of inflection is reported.

The Tcg represents the peak temperature at which the amorphous polymer or film sample will crystallize from the glass. Tcg summarized in Table 6 is the peak on the exotherm. Delta H Tcg represents the heat released from the sample during crystallization and is calculated by measuring the area under the crystallization exotherm.

The Tm represents the peak temperature at which the semi-crystalline sample melts. This is an endotherm on the first heat. On ten of the 13 example films there were two melting peaks observed on the first heat. Delta H Tm represents extra heat required to melt the sample and is calculated from the area in under the peak.

FIG. 8 represents the cooling curve on Example Film A from 270 to −40° C. at 10° C./minute. On this typical cooling curve profile, the inflection and peak of interest is:

Tc is the peak crystallization temperature of the molten polymer as it cools and crystallizes is of interest. Delta H Tc is the area under the peak and represents the heat evolved from the sample as it crystallizes.

FIG. 9 represents the second heat on Example Film A from −40 to 270° C. at 10° C./minute. On the second heat curve shown in FIG. 9, there is a Tg and a Tm. In one of the thirteen films there were clearly two melting peaks on the second heat.

Figure 10:
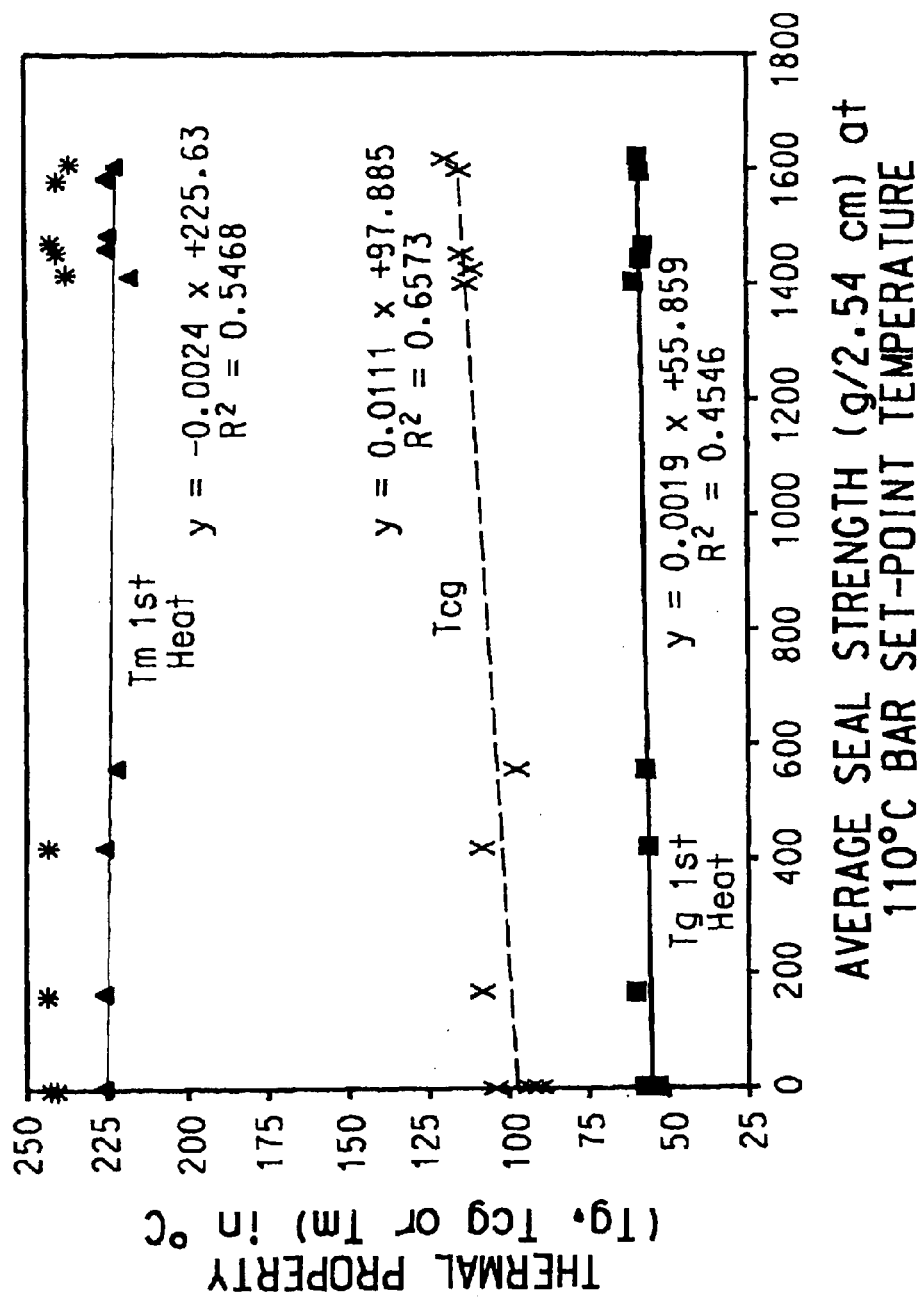
FIG. 10 is a graph showing the first heat thermal properties of monolayer cast film samples, using the data in Table 17, as a function of average seal strength (g/2.54 cm) at 110° C. Bar Set-point temperature.
Figure 11:
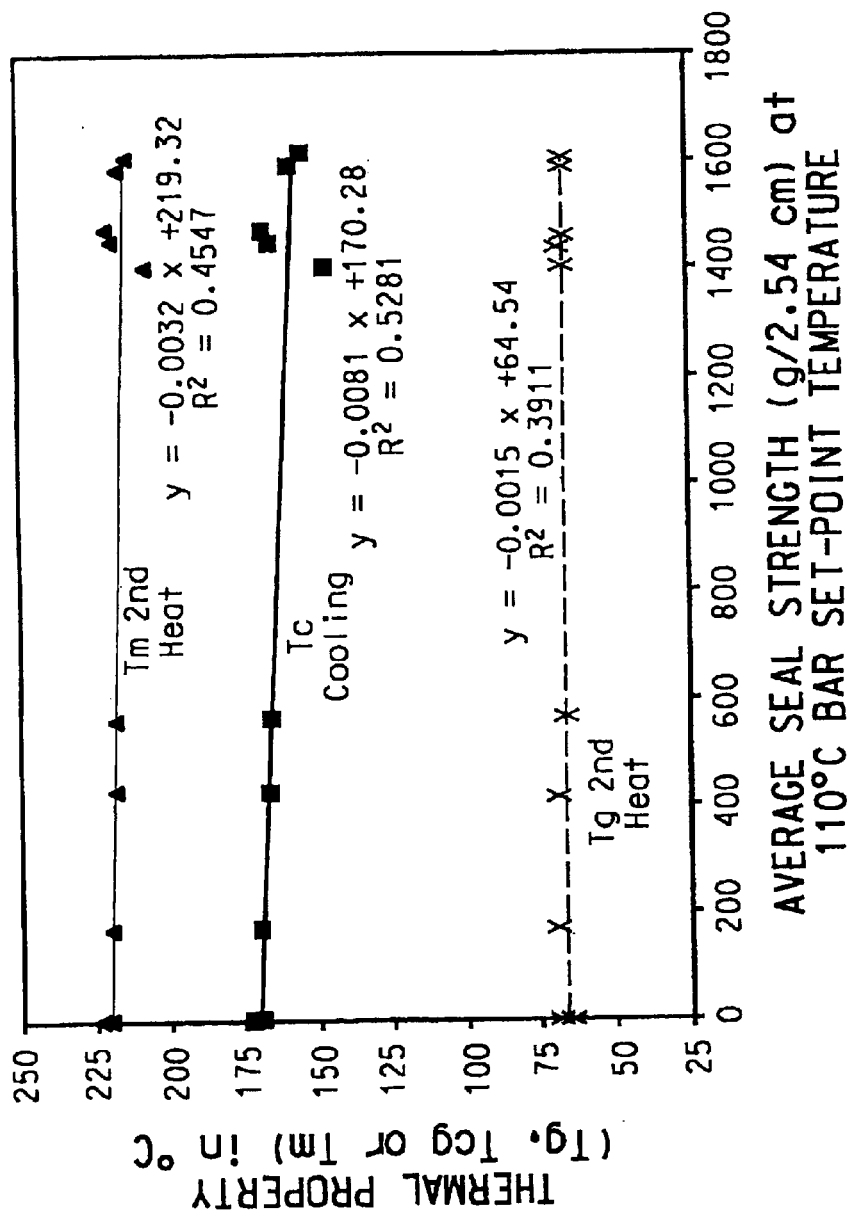
FIG. 11 is a graph showing the cooling curve Tg and second heat thermal properties of monolayer cast film samples, using the data in Table 17, as a function of average seal strength (g/2.54 cm) at 110° C. Bar Set-point temperature.
Figure 12:
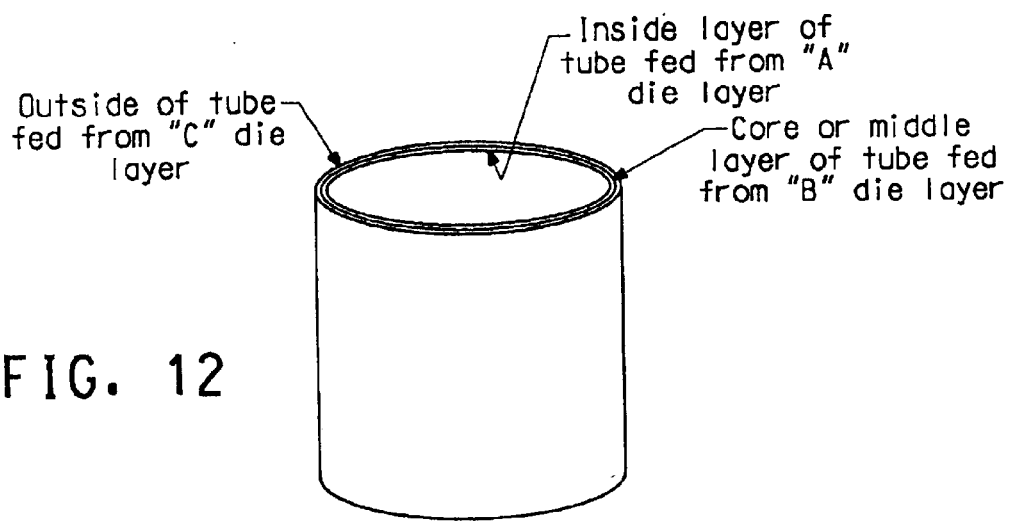
FIG. 12 perspective side view illustrating the three-layer coextruded blown film tube produced according to the method of the instant invention.

Table 17 summarizes the key thermal property measures for all thirteen example films. FIGS. 10 and 11 illustrate correlations between key thermal properties and seal strength at 110° C. FIG. 10 plots the Tg, Tcg and Tm measured on the first heat versus the average seal strength at 110° C. As such, FIG. 10 plots the thermal properties for the Example films vs average peak seal strength at 110° C. seal bar set point. FIG. 11 plots the Tcg from the cooling curve along with the Tg and Tm from the second heat vs average peak seal strength at 110° C. seal bar set point. Linear curve fits of the thermal data to the average seal strength are also overlaid on FIGS. 10 and 11, while some linear relationships may be present, the correlation coefficients ($R^2$) are consistently poor. In summary no single thermal property can be used to predict the strength of the seal that would be formed at 110° C. seal bar temperature.

TABLE 17 summarizes the Three Pass DSC thermal measurements on the 13 monolayer films.

| | | | First Heat | | | | | | | 2nd Heat | | |
| | | | | | | | | Cooling | | | | Delta | |
| Example Film | Tg (° C.) | Tcg (° C.) | delta H Tcg J/g | Tm ° C. | delta H Tml J/g | Tm ° C. | Delta H Tm J/g | Tcm ° C. | Htcm J/g | Tg 2nd ° C. | Tm 2nd ° C. | H Tm 2 J/g | Tm 2nd ° C. |
|---|---|---|---|---|---|---|---|---|---|---|---|---|---|
| A | 56 | 91  | 32 | 227 | 43 | 243 | 12 | 175 | 37 | 64 | 221 | 33 | |
| B | 60 | 111 | 30 | 225 | 28 | 244 | 23 | 169 | 31 | 67 | 219 | 33 | |
| C | 61 | 113 | 23 | 219 | 27 | 237 | 12 | 146 | 25 | 66 | 208 | 23 | |
| D | 55 | 92  | 30 | 226 | 43 | 241 | 9  | 168 | 36 | 64 | 219 | 32 | |
| E | 55 | 94  | 31 | 225 | 50 |     |    | 169 | 35 | 63 | 219 | 33 | |
| F | 56 | 95  | 30 | 225 | 51 |     |    | 172 | 37 | 63 | 220 | 35 | |
| G | 56 | 99  | 30 | 223 | 50 |     |    | 166 | 37 | 64 | 217 | 34 | |
| H | 58 | 114 | 28 | 223 | 33 | 240 | 16 | 159 | 31 | 68 | 215 | 32 | |
| I | 58 | 119 | 29 | 220 | 33 | 235 | 13 | 154 | 30 | 67 | 213 | 31 | |
| J | 59 | 111 | 29 | 225 | 34 | 241 | 16 | 165 | 30 | 68 | 217 | 30 | |
| K | 57 | 109 | 28 | 225 | 31 | 243 | 19 | 166 | 34 | 67 | 217 | 32 | |
| L | 58 | 113 | 28 | 224 | 50 | 243 | NM | 168 | 33 | 66 | 219 | 31 | |
| M | 54 | 106 | 26 | 226 | 31 | 244 | 20 | 169 | 32 | 66 | 219 | 32 | 232 |

NM = not measured

Example Set N to Z and AA and AB - Heat-Sealable Coextruded Polyester Films:

The monolayer example films A through M illustrated the need for extended extruder hold-up time and or elevated melt temperature to prepare heat sealable mono-layer cast films comprising the co-monomer 1,3 propanediol.

The need for hold-up time and or elevated melt temperatures that was learned from mono-layer cast film processing can also applied to co-extruded films where one or both of the outside layers are used to make a heat seal-able layer from polymers comprising the co-monomer 1,3 propanediol. The following example films were prepared using a Brampton Engineering (Brampton, Ontario Canada) three layer blown film extrusion line. A tube of film with three distinct layers was extruded upwards. FIG. 7 is an attempt to illustrate the layer arrangement in the tube produced by the three-layer blown film line The three layer die had a 76 mm (3") diameter annular die body with a 50 mm (2") annular lip set and 1650 μm die gap. Each layer of the die (A layer, B layer or C layer) was fed from identical 32 mm (1¼") diameter extruders with a 30/1 length to diameter ratio. The screw design was the same design previously described in the monolayer cast film examples. Each extruder was fed resin pellets from loss in weight feeders. The coextruded example films had one layer (either the A or C) made from the previously described Blend 1 or Blend 2. The core layer in the film was fed from the "B" layer on the die and B extruder. The core layer in all cases was a 0.931 g/cm³, g/cm³, 2.8 Melt Index (MI) anhydride modified ethylene acrylate copolymer sold by DuPont under the tradename Bynel™ 2174. The third layer in the three layer structure was a 0.962 gm/cm³ density, 0.72 MI polyethylene sold by Nova Chemical under the tradename Sclair™ 19A. or a 0.958 g/cm³ density, 0.95 MI MI polyethylene sold by Nova Chemical under the tradename Sclair™ 19C.

The molten tube of film once it exited the die was quenched with a Brampton Engineering supplied air ring. The distance from die face to primary nip was approximately 4.3 meters. All of the co-extruded example films were made with a nominal overall film gauge of 61 μm and a nominal collapsed tube layflat of 210 mm (2.7/1 Blow-up ratio). In each case the collapsed tube was slit in line to produce two sheets of film that were wound onto 76 mm diameter paper cores with the inside bubble surface (A layer) wound in on the core. The film winder (model DT 8366) was built by Macro Engineering (Mississauga, Ontario, Canada).

Resin Drying and Handling;

Only the polyester resins were dried at 121° C. (250° F.) overnight in a desiccated hopper dryer system prior to blending and transfer into the nitrogen swept, loss in weight feed hopper. The polyethylene and anhydride modified ethylene acrylate polymers were loaded directly from the bag or box into the hopper of the loss in weight feed hopper.

Film Structures;

Table 18 summarizes the nominal structure of the fifteen films. Films N to Z were made with the polyester sealant layer on the inside of the bubble. Films AA and AB were made with the polyester sealant on the outside of the bubble. In all cases the anhydride modified ethylene acrylate polymer was used in the middle layer.

TABLE 18

Nominal Structure of Coextruded Example Films

| Example Film | Inside Bubble A layer | Core of Bubble B layer | Outside Bubble C Layer | Individual Layer Gauge (μm) | Overall (μm) |
|---|---|---|---|---|---|
| N  | Blend 2   | Bynel 2174 | Sclair 19A | 8/8/45   | 61 |
| O  | Blend 2   | Bynel 2174 | Sclair 19A | 8/26/27  | 61 |
| P  | Blend 2   | Bynel 2174 | Sclair 19A | 15/8/38  | 61 |
| Q  | Blend 1   | Bynel 2174 | Sclair 19A | 8/8/45   | 61 |
| R  | Blend 1   | Bynel 2174 | Sclair 19A | 15/8/38  | 61 |
| S  | Blend 2   | Bynel 2174 | Sclair 19C | 15/8/38  | 61 |
| T  | Blend 2   | Bynel 2174 | Sclair 19C | 25/8/28  | 61 |
| U  | Blend 1   | Bynel 2174 | Sclair 19C | 25/8/28  | 61 |
| V  | Blend 1   | Bynel 2174 | Sclair 19C | 25/8/28  | 61 |
| W  | Blend 2   | Bynel 2174 | Sclair 19C | 25/8/28  | 61 |
| X  | Blend 2   | Bynel 2174 | Sclair 19C | 15/8/38  | 61 |
| Y  | Blend 2   | Bynel 2174 | Sclair 19C | 15/8/38  | 61 |
| Z  | Blend 1   | Bynel 2174 | Sclair 19C | 15/8/38  | 61 |
| AA | Sclair 19C | Bynel 2174 | Blend 2   | 38/8/15  | 61 |
| AB | Sclair 19C | Bynel 2174 | Blend 1   | 38/8/15  | 61 |

Figure 13:
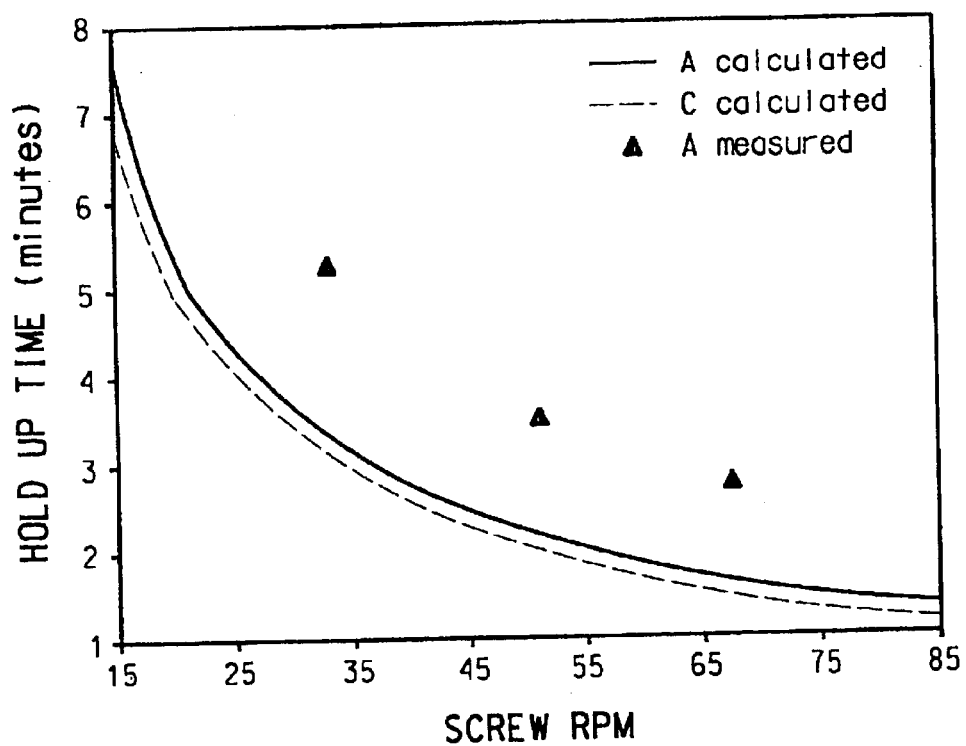
FIG. 13 is a graph showing the estimated hold-up time in minutes as a function of screw rpm calculated based on the geometry of the A and C layers on the coextruded blown film illustrated in FIG. 12 and as measured for layer A by dropping a colored pellet in the A extruder feed throat.
Figure 14:
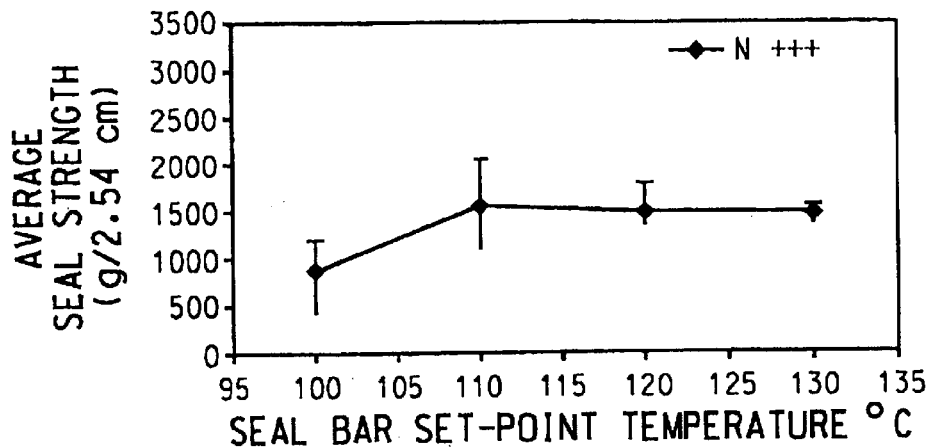
FIGS. 14 through 28 are graphs showing the average heat seal strength (showing maximum and minimum values) as a function of sealing bar setpoint temperature for fin seals made on coextruded films of Examples N through Z, AA, and AB of Table 21.
Figure 15:
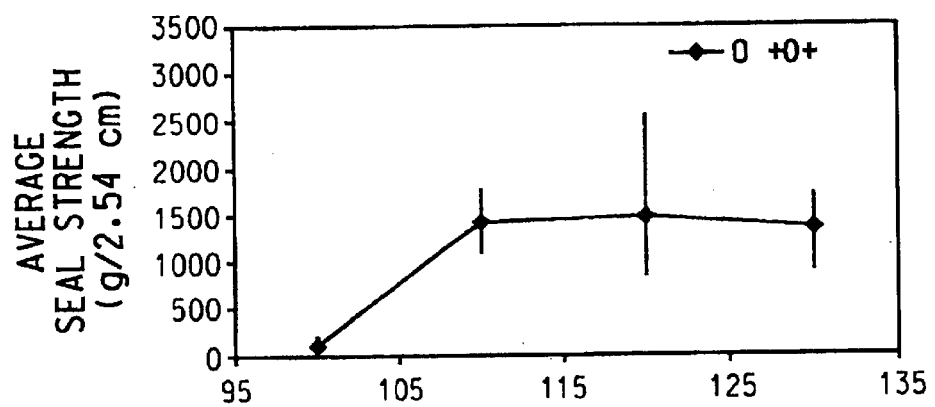
Figure 16:
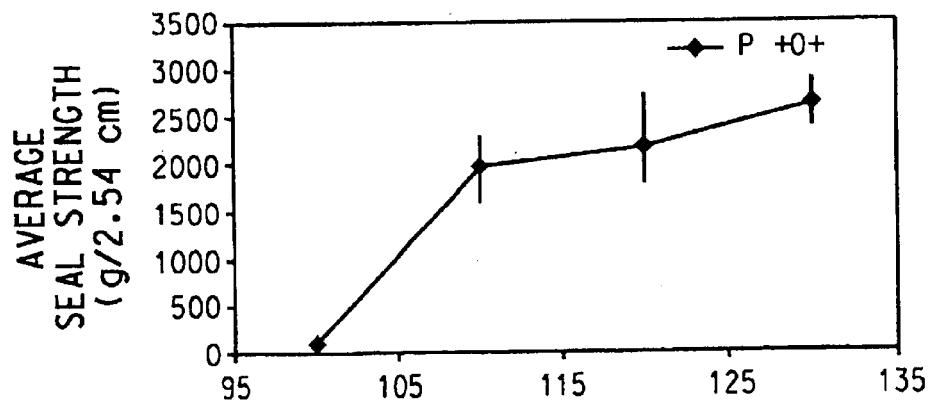
Figure 17:
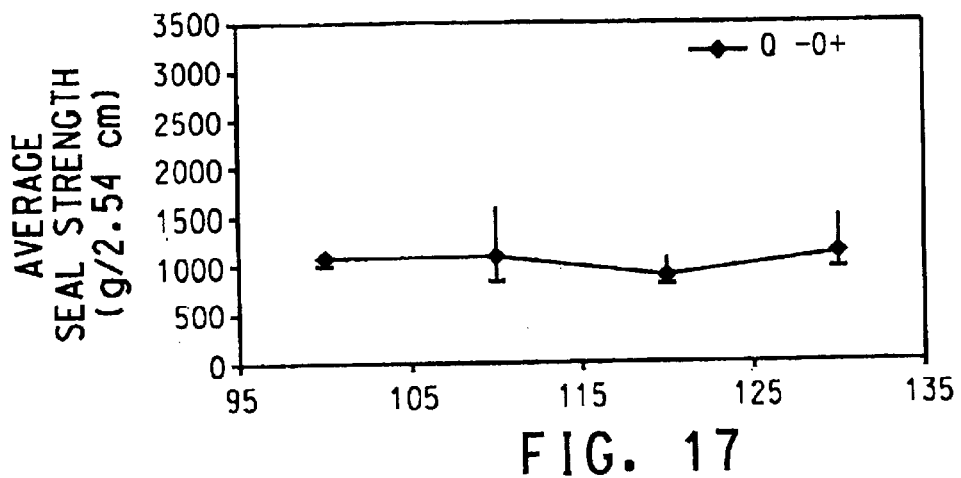
Figure 18:
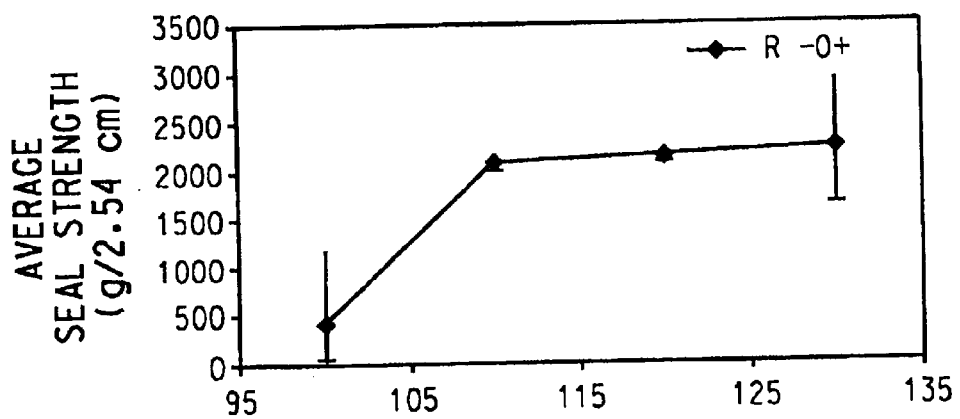
Figure 19:
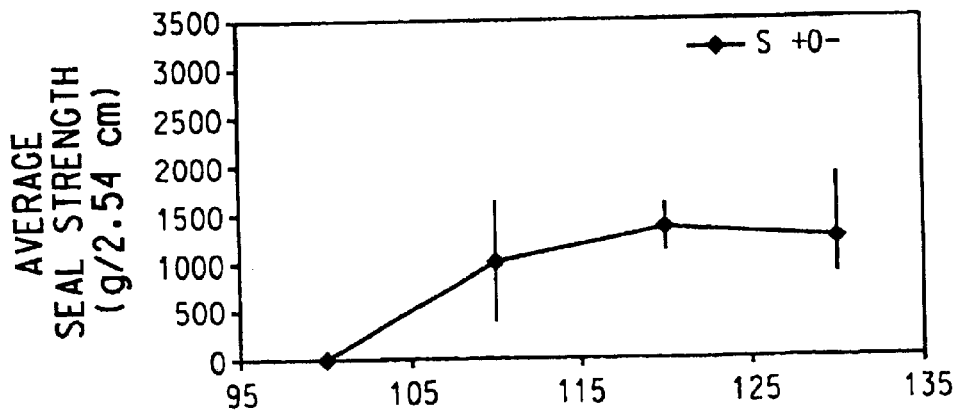
Figure 20:
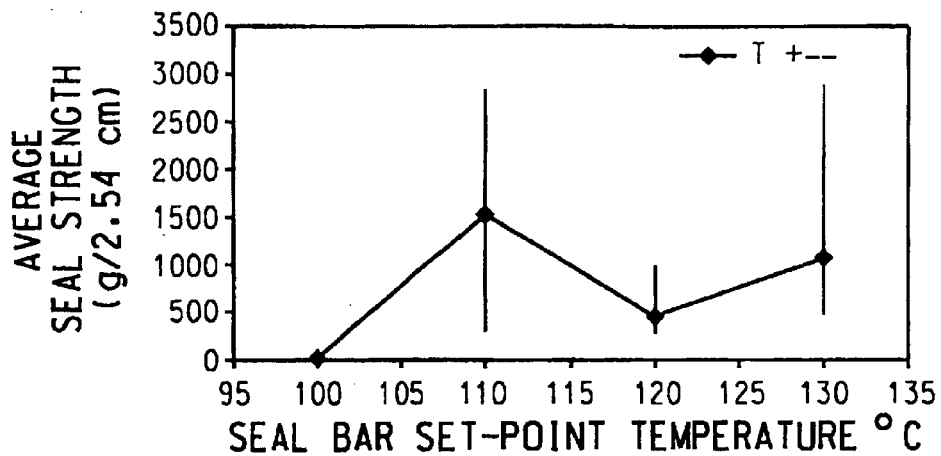
Figure 21:
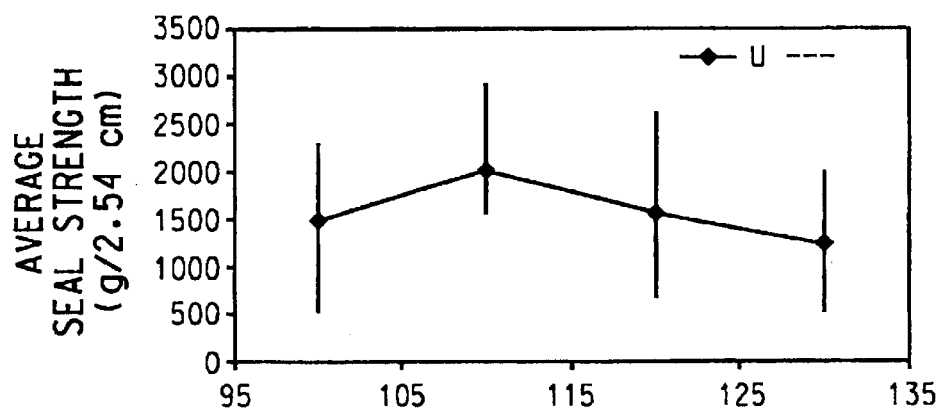
Figure 22:
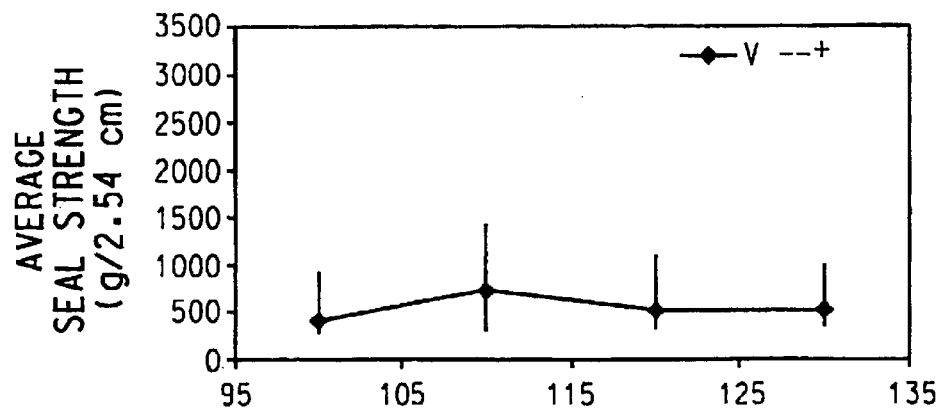
Figure 23:
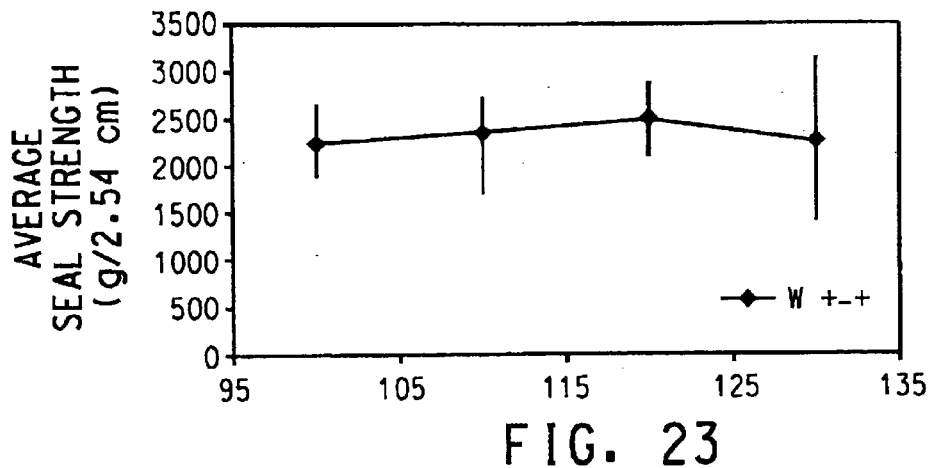
Figure 24:
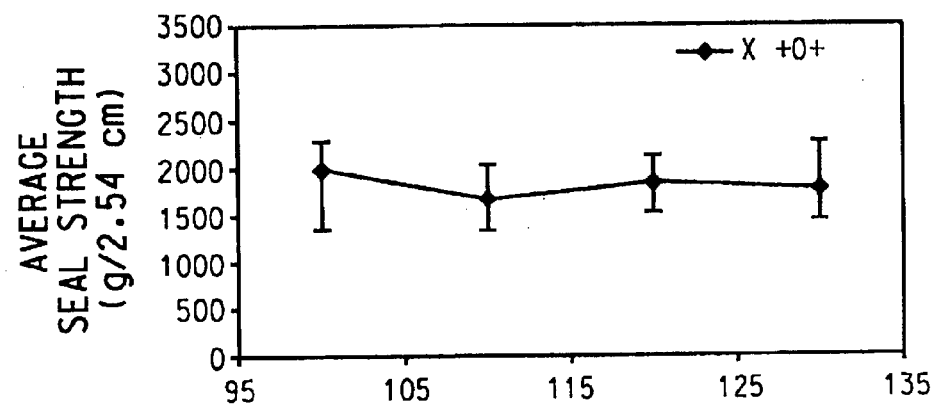
Figure 25:
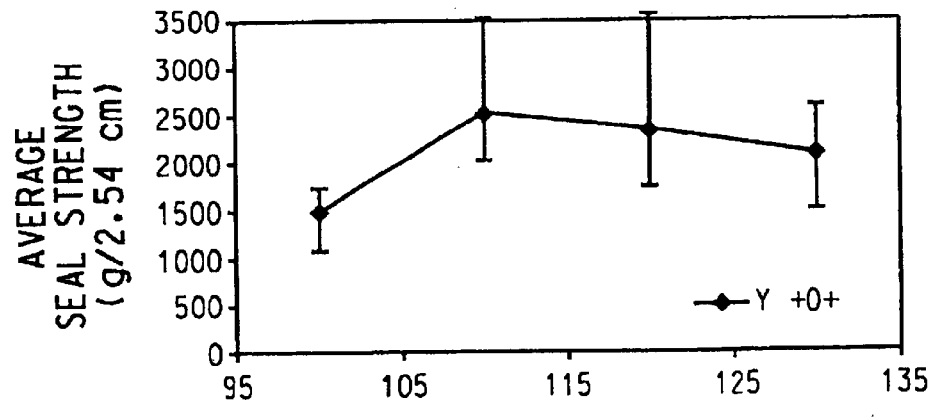
Figure 26:
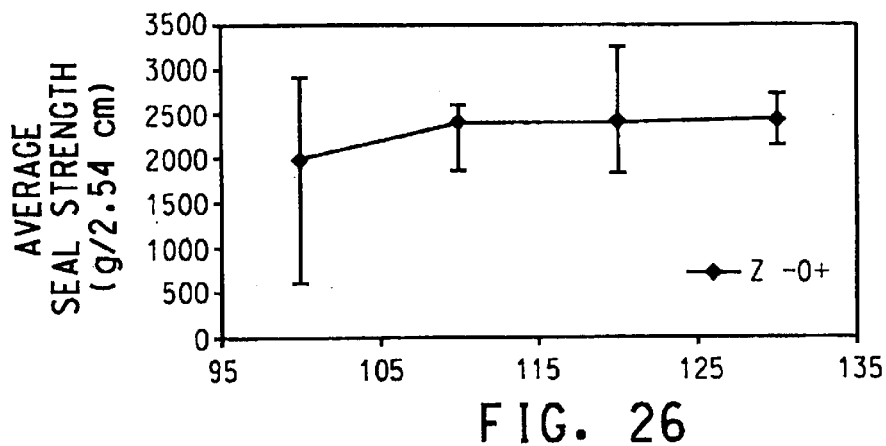
Figure 27:
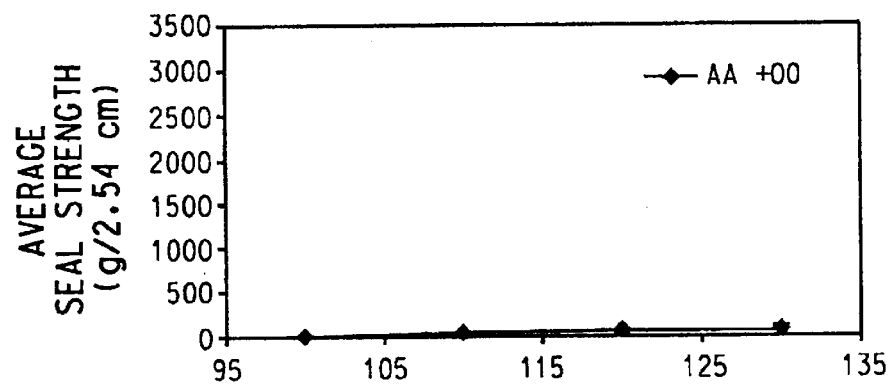
Figure 28:
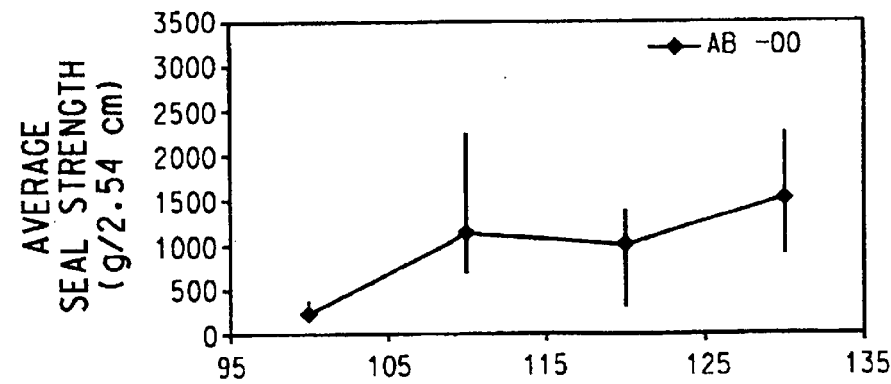

FIG. 13 shows the estimated hold-up time based on geometry for the A and C layers on the co-extruded blown film line. Overlaid on those curves is the estimated hold-up time based on the time required for a colored pellet dropped in A extruder feed throat to appear at the die lip. As mentioned in the previous section on monolayer films, the colored pellet is biased towards over estimating the hold-up time.

Table 19 reports the hold-up time estimates based on geometry, the measured adapter melt temperature (for the polyester layer) and fraction 3GT in the blend composition for each of the example coextruded films. A flush mounted probe inserted through the wall of the adapter pipe that carried the polymer melt between the extruder and die estimated the melt temperature of the polymer in each layer. The adapter melt temperature was measured using a J type thermocouple probe where depth to which the probe extended into the polymer melt was adjustable. The diameter of the adapter melt channel was approximately 17 mm. Testing determined the melt temperature rose at most 3° C. as the probe moved from the wall into the center of the polymer melt stream.

FIG. 13—Hold-Up Time estimates based on Geometry and by colored pellet for the A and C co-extruded film layers versus the screw speed.

TABLE 19

Fraction 3GT, Hold-Up Time and Adapter Melt Temperature for the Coex Films

| Example Film | x 3GT | | HUT (min) | | MT ° C. | | Sum |
|---|---|---|---|---|---|---|---|
| N | 50% | + | 5.5 | + | 292 | + | +++ |
| O | 50% | + | 3.1 | 0 | 292 | + | +0+ |
| P | 50% | + | 2.2 | 0 | 292 | + | +0+ |
| Q | 70% | − | 2.4 | 0 | 291 | + | −0+ |
| R | 70% | − | 2.4 | 0 | 292 | + | −0+ |
| S | 50% | + | 2.3 | 0 | 272 | − | +0− |
| T | 50% | + | 1.6 | − | 272 | − | +−− |
| U | 70% | − | 1.5 | − | 271 | − | −−− |
| V | 70% | − | 1.4 | − | 286 | + | −−+ |
| W | 50% | + | 1.4 | − | 293 | + | +−+ |
| X | 50% | + | 2.2 | 0 | 292 | + | +0+ |
| Y | 50% | + | 2.2 | 0 | 292 | + | +0+ |
| Z | 70% | − | 2.2 | 0 | 292 | + | −0+ |
| AA | 50% | + | 2.4 | 0 | 280 | 0 | +00 |
| AB | 70% | − | 2.3 | 0 | 280 | 0 | −00 |

In Table 19,
+'s were assigned to those processing factors that should have a positive influence on the resulting seal strength.
−'s were assigned to those processing factors that would have a negative influence on the resulting seal strength
0' were assigned to process factors that represented midpoints between a high and a low processing conditions.

Based on the +'s, 0's and −'s in Table 19, that were assigned to the various example films and assuming an equal weight in the importance of each factor, a film with three pluses should perform better than a film with three minuses.

The film processing conditions for Example Films N, U and AA are shown in Table 20. In each case the tube was edge slit into two sheets that were wound onto separate 76 mm diameter paper cores.

Analysis of Coextruded Films;

The rolls were stored in 80 to 100 micron thick polyethylene bags sealed with twist ties or tape.

The coextruded sample films were stored in the plastic bags at ambient conditions for up to 7 days and then samples were removed from the bags for 24 hours of conditioning at 23±1° C. and 50% RH. Immediately following the 24 hour exposure, the films were heat sealed together to form fin seals. Sealing bar set-point temperatures were from 90 to 130° C. in 10° C. increments. Heat seals were prepared using a Sencorp Systems (Hyannis Mass. USA 02601) Model 12ASL/1 heat sealer. At seal bar set-points of 90, 100 and 110° C. no slip sheet was required. At 120 and 130° C., a 12.5 μm (0.5 mil) DuPont Mylar® film slip sheet was used to prevent sticking of the outer polyethylene layer on the coex film to the hot sealing bar. The Sencorp sealer was set-up with a 276 kPa (40 psi) sealing bar pressure, a 2.5 cm (1.0") wide by 30.5 cm (12½") long sealing bar, and a 0.5 sec dwell. Heat was applied to the upper bar only. The lower, unheated bar comprised a 2.5 cm wide by 30.5 cm long piece of red rubber in a steel holder. Following ASTM procedure F88, coupons 25.4 mm wide by 70 to 100 mm long were die cut from the sealed films to test the strength of the seals. In all cases the orientation of the fin seal was in the transverse direction. The 25.4 mm wide seals were pulled in the MD direction using an Instron model 4469 with a 50.8 mm (2") initial jaw separation, 25.4 cm/min (10"/min) jaw separation rate with ambient conditions of 23±1° C. and 50% RH. The tail was held by hand to ensure a 90° orientation of tail to direction of pull. Generally four coupons were tested at each sealing bar set-point temperature. The average peak seal strength along with standard deviation are reported in Table 10 for example films N through AB. In addition the failure mode of the test strips has also been reported.

TABLE 20

Three Layer Coex Film Processing Conditions for Example Films N, U and AA

| Exampl Film | Lay r A | Layer B | Layer C | Air Ring % | Air in Air Ring ° C. | Nip Tension (kg) |
|---|---|---|---|---|---|---|
| N | Blend 2 | 2174 | 19A | 41.9 | 23 | 3.6 |
| U | Blend 1 | 2174 | 19A | 39.4 | 22 | 3.6 |
| AA | 19C | 2174 | Blend 2 | 39.3 | 25 | 3.7 |

| | Resin Throughputs (kg/hr) | | | Melt Temperature ° C. | | |
|---|---|---|---|---|---|---|
| | A | B | C | A | B | C |
| N | 3.1 | 2 | 11.5 | 292 | 236 | 236 |
| U | 13.6 | 3 | 10.8 | 271 | 233 | 205 |
| AA | 13.8 | 2.8 | 7.5 | 244 | 230 | 280 |

TABLE 20-continued

Three Layer Coex Film Processing Conditions for Example Films N, U and AA

| Exampl Film | Lay r A | Layer B | Layer C | Air Ring % | Air in Air Ring ° C. | Nip Tension (kg) |
|---|---|---|---|---|---|---|
| | Layer Ratio (%) | | | Layer Thickness (μm) | | |
| | A | B | C | A | B | C |
| N | 14 | 13 | 72.5 | 8.9 | 8 | 45 |
| U | 40 | 12 | 43.5 | 25.6 | 8 | 28 |
| AA | 65 | 14 | 25.7 | 38 | 8 | 15 |
| | Melt Pressure (Bars) | | | Barrel Pressure (bars) | | |
| | A | B | C | A | B | C |
| N | 24 | 29 | 154 | 44 | 25 | 210 |
| U | 80 | 69 | 216 | 136 | 84 | 287 |
| AA | 256 | 71 | 56 | 364 | 85 | 72 |
| | % motor load | | | rpms | | |
| | A | B | C | A | B | C |
| N | 11 | 3 | 40 | 18.2 | 6.2 | 116.3 |
| U | 43 | 29 | 54 | 76.2 | 26.4 | 109.5 |
| AA | 56 | 27 | 25 | 148.3 | 24.3 | 46.3 |
| Extruder A | Zone 1 Actual ° C. | Zone 2 Actual ° C. | Zone 3 Actual ° C. | Zone 4 Actual ° C. | Adapter A Actual ° C. | Die A Actual ° C. |
| N | 202 | 271 | 271 | 269 | 266 | 265 |
| U | 243 | 246 | 246 | 246 | 247 | 257 |
| AA | 179 | 206 | 223 | 232 | 222 | 218 |
| Extruder B | Zone 1 Actual ° C. | Zone 2 Actual ° C. | Zone 3 Actual ° C. | Zone 4 Actual ° C. | Adapter B Actual ° C. | Die B Actual ° C. |
| N | 152 | 221 | 219 | 220 | 221 | 234 |
| U | 151 | 220 | 220 | 219 | 220 | 232 |
| AA | 149 | 222 | 220 | 218 | 219 | 228 |
| Extruder C | Zone 1 Actual ° C. | Zone 2 Actual ° C. | Zone 3 Actual ° C. | Zone 4 Actual ° C. | Adapter C Actual ° C. | Die C Actual ° C. |
| N | 179 | 194 | 195 | 197 | 196 | 216 |
| U | 178 | 195 | 197 | 198 | 196 | 218 |
| AA | 202 | 267 | 269 | 272 | 265 | 265 |
| | Die Bottom Actual ° C. | Mandrel Actual ° C. | Outer Lip Actual ° C. | Density (g/cm³) | | |
| | | | | A | B | C |
| N | 245 | 241 | 235 | 1.33 | 0.93 | 0.96 |
| U | 241 | 250 | 234 | 1.33 | 0.93 | 0.96 |
| AA | 223 | 234 | 235 | 0.96 | 0.93 | 1.33 |
| | Blower P cm H2O | Frost Line Ht (cm) | BUR | DDR | Layflat (mm) | Line Speed (m/min) |
| N | 12 | 18 | 2.7 | 10.0 | 208 | 10.6 |
| U | 10 | 18 | 2.6 | 10.0 | 201 | 15.9 |
| AA | 10 | 22 | 2.8 | 10.1 | 219 | 15 |

TABLE 21

Average Seal Strength (± standard deviation)
at Seal Bar Set-Point Temp of 100, 110, 120 and 130° C.

| Example Film | 100° C. | 110° C. | 120° C. | 130° C. |
|---|---|---|---|---|
| N | 865 ± 375 Peel | 1,573 ± 449 delamination | 1,542 ± 209 Delamination | 1,510 ± 136 Delamination |
| O | 160 ± 113 Peel | 1,424 ± 289 delamination | 1,475 ± 761 Delamination | 1,309 ± 504 Delamination |
| P | 143 ± 62 Peel | 1,946 ± 345 delamination | 2,216 ± 513 Delamination | 2,660 ± 202 Delamination |
| Q | 1,074 ± 90 Delamination | 1,116 ± 345 delamination | 817 ± 171 Delamination | 1,169 ± 261 Delamination |
| R | 410 ± 571 Peel | 2,086 ± 120 delamination | 2,155 ± 62 Delamination | 2,257 ± 552 Delamination |
| S | 0 Peel | 993 ± 585 Peel | 1,341 ± 243 Peel | 1,246 ± 496 Peel |
| T | 0 Peel | 1,604 ± 1,062 Peel | 418 ± 391 Peel | 1,149 ± 1,106 Peel |
| U | 1,484 ± 785 Delamination | 2,014 ± 643 delamination | 1,600 ± 827 Delamination | 1,217 ± 630 Delamination |
| V | 405 ± 330 Peel | 764 ± 484 Peel | 519 ± 402 Peel | 528 ± 360 Peel |
| W | 2,207 ± 432 Peel | 2,325 ± 556 delamination | 2,466 ± 383 Delamination | 2,261 ± 914 Delamination |
| X | 1,980 ± 474 Delamination | 1,678 ± 334 delamination | 1,837 ± 256 Delamination | 1,800 ± 460 Delamination |
| Y | 1,461 ± 304 Delamination | 2,539 ± 651 delamination | 2,304 ± 878 Delamination | 2,054 ± 492 Delamination |
| Z | 1,992 ± 1,061 Delamination | 2,383 ± 415 delamination | 2,372 ± 502 delamination | 2,408 ± 747 Delamination |
| AA | 30 ± 10 Peel | 66 ± 28 Peel | 90 ± 34 peel | 95 ± 42 Peel |
| AB | 217 ± 122 Peel | 1,162 ± 722 delamination | 960 ± 700 delamination | 1,547 ± 506 Delamination |

In FIGS. 14 through 28 the Average Seal Strength (including error bars) has been graphed as a function of Seal bar Set-point temperature. The error bars represent the maximum and minimum values of seal strength measured in the four samples used to calculate the average.

These figures illustrate that films made with the processing parameters (fraction 3GT, HUT and Melt Temperature) to the plus side or at the least the fewest negative processing parameters tended to have the most consistently strong seals (greater than 1000 gm/2.5 cm of seal).

Of the 15 coextruded example films, films S(+0−), T (+−−), V (−−+), and AA (+00) all demonstrated undesirable peel seal failure modes at 110, 120 and 130° C. It would be preferred to have delamination of the tie layer from the seal layer the dominant mode of failure. Film samples that had a peel failure mode generally had inferior seal strengths relative to the benchmark of 1000 g/2.5 cm of seal strength. Example film U (−−−) had an undesirable erratic seal strengths yet the mode of failure was delamination and the averages were above 1000 g/2.5 cm of seal.

EXAMPLES 29 and 30

Example films 29 and 30 demonstrates the effectiveness of 3GT copolymers as low-temperature heat-seal layers. Example film 29 was made from a copolymer prepared from dimethyl terephthalate, cyclohexane dimethanol and 1,3 propanediol and is referred to as 3GT/CHDM. Example film 30 was made from a copolymer prepared from dimethyl terephthalate, ethylene glycol and 1,3 propanediol. The ratio of 3G to 2G is essentially a 70/30 ratio and is referred to as 3GT/2GT.

Preparation of 3GT/CHMD (~10 mol %) Copolymer from 1,4-cyclohexanedimethanol (CHDM), Dimethyl Terephthalate, and 1,3-propanediol A 25 gallon reactor was charged with 120 lbs. of dimethyl terephthalate, 12.3 lbs of CHDM, 60 lbs. of 1,3-propanediol for a mole ratio of (1,3-propanediol+CHDM): DMT of 1.4:1 and 6.6 grams of titanate catalyst. The temperature was raised to 200° C. and held for 2 hours. Methanol generated was removed as a liquid condensate by distillation.

After evolution of methanol had ceased, the resulting prepolymer was transferred to a different autoclave and polymerized at a temperature of 250° C. and a pressure of 0.4 mm Hg for 4 hours. The obtained random copolymer resin was pelletized. The intrinsic viscosity of the polymer was 0.77 dl/g. Data associated with the processing conditions and results for the amorphous film of Example 29 are presented below in the Tables 22, 23 and 24.

Preparation of 3GT/2GT (~30 mol %) Copolymer from Dimethyl Terephthalate, 1,3-propanediol and Ethylene Glycol A 25 gallon reactor was charged with 120 lbs. of dimethyl terephthalate, 47.5 lbs. of 3G, 16 lbs. of 2G for a mole ratio of (3G+2G):DMT of 1.4:1 and 18 g of Tyzor(R) TPT as the catalyst. The temperature was raised to 210° C. and held for 2 hours. Methanol generated was removed as a liquid condensate by distillation.

After evolution of methanol had ceased, the resulting prepolymer was transferred to an autoclave and polymerized at a temperature of 250° C. and a pressure of 0.4 mm Hg for 3 hours. The obtained copolymer 3GT/2GT resin was pelletized. The intrinsic viscosity of the random co-polymer was 0.782 dl/g. Prior to casting film the polymer was crystallized in a nitrogen swept oven for 3 hours at 130° C. The crystallized polymer was then solid stated for 8 hours at 182° C. in a packed bed solid stator using a continuous flow of hot nitrogen.

Film Casting;

Example films 29 and 30 were prepared on the same cast film equipment unit used to prepare example films 1 to 6 and 11. Processing conditions are given in Table 22. The thermal properties of the amorphous resins used to prepare film samples 29 and 30 were measured using the same DSC technique used to measure the thermal properties on example films 1 to 6. Example film 29 was heat sealed using the same sealing conditions and equipment as was used for example films 1 to 6. Likewise, the same slip-peel tester was used to measure the seal strength. The first heat thermal properties of the amorphous resins used to make example films 29 and 30 are summarized in Table 23. The seal strength vs sealing bar set-point temperature for example films 39 and 30 are given in Table 24.

TABLE 22

Processing Conditions for Amorphous Film Samples 29 and 30

| Example # | 29 | 30 |
|---|---|---|
| RESIN | 3GT/CHDM | 3GT/2GT |
| Wt. % | 100 | 100 |
| EXTRUDER Conditions | Temperature Actual | Temperature Actual |
| Barrel Zone 1° C. | 240 | 260 |
| Barrel Zone 2 | 240 | 240 |

TABLE 22-continued

Processing Conditions for Amorphous Film Samples 29 and 30

| Example # | 29 | 30 |
|---|---|---|
| RESIN | 3GT/CHDM | 3GT/2GT |
| Wt. % | 100 | 100 |
| EXTRUDER Conditions | Temperature Actual | Temperature Actual |
| Barrel Zone 3 | 240 | 240 |
| Barrel Zone 4 | 240 | 240 |
| Filter Flange - Die 1 | 240 | 241 |
| Adapter - Die 2 | 240 | 238 |
| Feed Block - Die 3 | 250 | 240 |
| End Flanges - Die 4 | 240 | 240 |
| Flat Die - Die 5 | 240 | 240 |
| Filter Melt | 234 | 235 |
| Adapter Melt | 240 | 246 |
| Before Filter - Pressure (psi) | 1510 | 2260 |
| After Filter - Pressure (psi) | 750 | 1140 |
| Screw R.P.M. | 40 | 50 |
| Screw Amps | 2.8 | 3.4 |
| CASTING UNIT | | |
| Casting Roll-F.P.M. | 39 | 60 |
| Haul Off Roll ratio to cast roll speed | 1.05 | 1.03 |
| Bowed Roll to cast roll ratio | 1.0 | 1.0 |
| Edge Pinners | YES | YES |
| Haul Off Roll Nip Pressure - PSI | 50 | 50 |
| Film Gauge (mls) | 1.5 | 1.4 |
| Thru-put (gm/min) | 90 | 125 |
| Thru-put (lb/hr) | 11.9 | 16.5 |
| $H_2O$ Recirculation Unit Temperature Set/Act ° F. | 65 | 55 |

TABLE 23

First Heat Thermal Properties on Amorphous Resin Samples 3GT/CHDM and 3GT/2GT

| Example | Tg (° C.) | Tcg (° C.) | deltaH Tcg (J/g) | Tm (° C.) | deltaH Tm (J/g) |
|---|---|---|---|---|---|
| 3GT/CHDM | 49.0 | 85.0 | 31.8 | 216.0 | 44.0 |
| 3GT/2GT | 54 | 85.4 | 30.4 | 212.4 | 49.2 |

TABLE 24

Average Seal Strength vs Sealing Bar Set-point Temperature for example films 29 and 30
Units of seal strength are gm/0.5 in.

| Bar Setpoint Temperature ° C. | Example Film 12 | Example Film 13 |
|---|---|---|
| 90 | 0 | 686 |
| 100 | 0 | 1084 |
| 110 | 180 | 1172 |
| 120 | 1024 | 1364 |
| 130 | 1124 | 1471 |
| 140 | 1513 | 1177 |

EXAMPLES 31 and 32

Elongation Retention after Conditioning at 40° C. and 80% RH for Four Days

In Japanese patent JP 10-279707 referred previously disclosed a co-polyster film that would have 100% extension (elongation) after storage at 40° C. for five days was disclosed. The annealing conditions and subsequent film extension test are described as follows:

Extension: After leaving the film at a temperature of 40° C. and a relative humidity of 80% for 5 days, we determined the breaking extension (%) in the longitudinal and transverse direction of the film sample of 10 mm in width and 50 mm in length at the rate of stretch rate of 300 mm/min using a tension tester (stretch tester) according to ASTM D-882-81 (A) method. The number of test (n) was 5 for each direction, and mean values were obtained, To show that films typical of those claimed in the instant invention would not retain the desired 100% elongation, we measured the elongation on example films 31 and 32 before and after conditioning for 4 and seven days at conditions essentially as described in Japanese patent JP 10-279707 in that the conditioning apparatus maintained the RH at 80±10% RH over the seven day test period at 40° C.

Film Preparation:

Example films 31 and 32 were cast from solid stated example resins of Examples 9 and 10. Film Casting conditions are given in Table 25.

Figure 29:
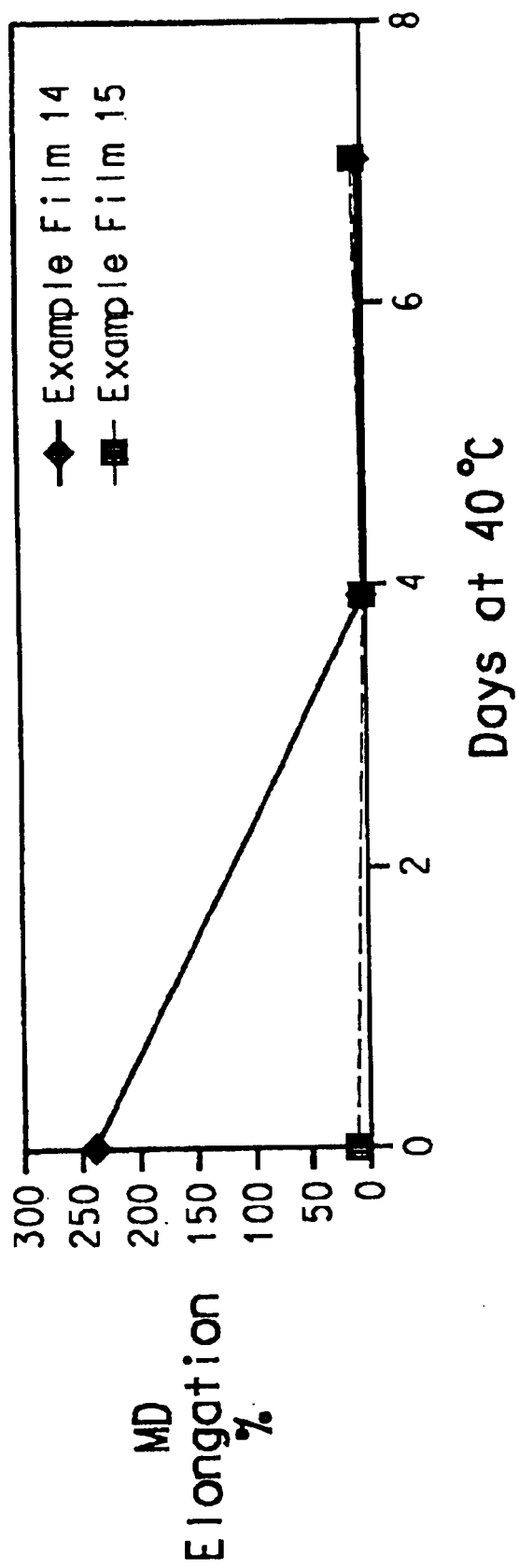
FIG. 29 is a graph showing the average MD elongation to break for Example cast films 14 and 15 before and after conditioning at 40° C.
Figure 30:
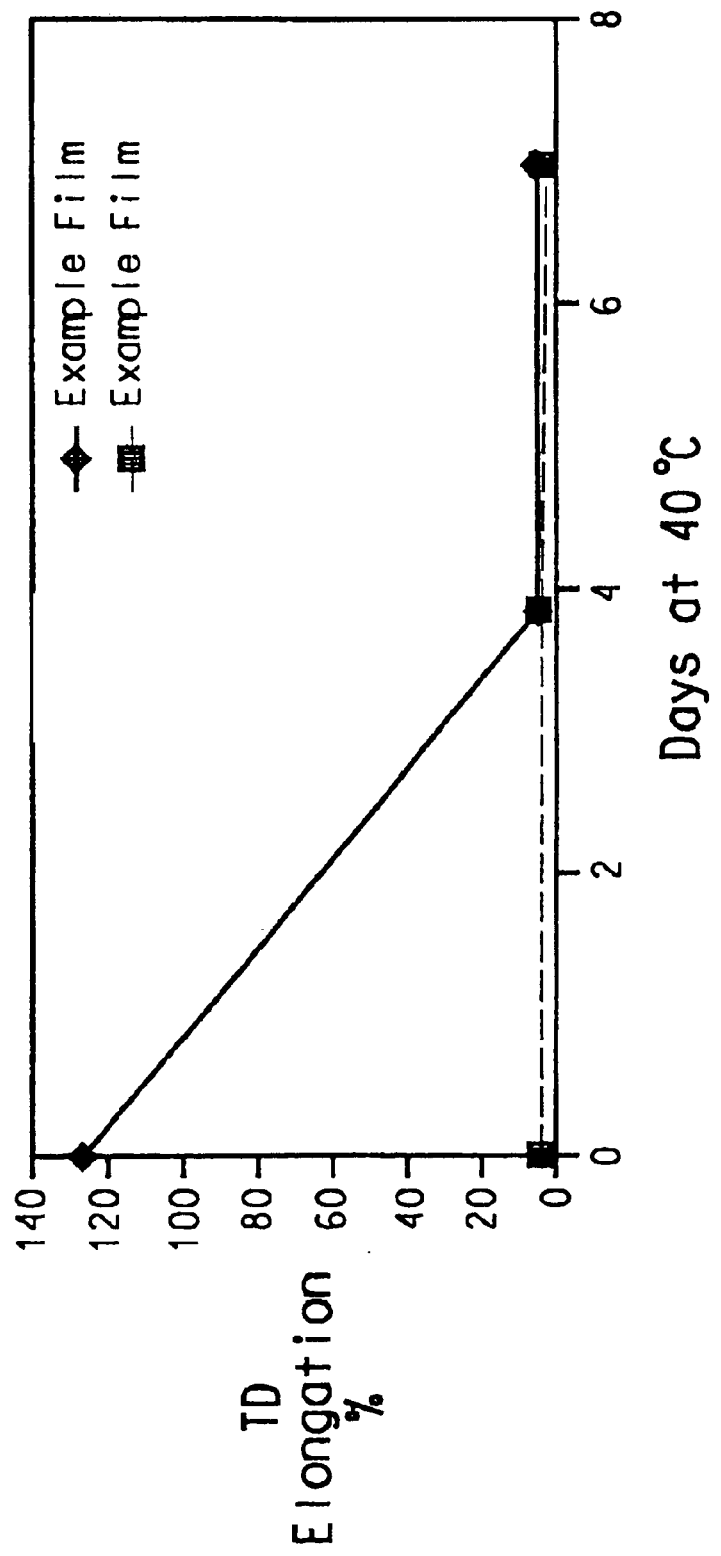
FIG. 30 is a graph showing the average TD elongation to break for Example cast films 14 and 15 before and after conditioning at 40° C.

Tensile Testing According to ASTM D882:

Samples 12.7 mm (0.5") wide by 101.6 mm (4") long were die cut from Example films 31 and 32. A set of samples was taken with the long axis in Machine Direction (MD) and a set of samples was taken with the long axis in the Transverse Direction (TD). Six MD and six TD oriented samples were taken from each film then conditioned for two days at 50% RH and 23° C. (72° F.). After conditioning and the elongation to break was measured according to ASTM D882 method A using an Instron Model 4469 set-up with a 2 inch gauge length and a 300 mm/min XHS (as per the Japanese patent). Additional MD and TD samples from each film were conditioned for 3.8 and seven days at 40±0.5° C. and 80±10% RH. After the elevated conditioning the samples were allowed to re-equilibrate at 23° C. and 50% RH after which the elongation to break was again measured. FIG. 29 plots the average Machine Direction elongation to break for example films 31 and 32 before and after the conditioning at 40° C. FIG. 30 plots the changes in TD elongation to break after the same conditioning period.

TABLE 15

Processing Conditions for Amorphous Example Films 14 and 15

| Example Film # | 14 | 15 |
|---|---|---|
| RESIN | Resin 9 | Resin 10 |
| | 20 wt % 3GT 80 wt % 2GT-I | 70 wt % 3GT 30 wt % 2GT-I |
| EXTRUDER Conditions | Temperature Actual | Temperature Actual |
| Barrel Zone 1° C. | 280 | 285 |
| Barrel Zone 2 | 270 | 270 |
| Barrel Zone 3 | 270 | 270 |
| Barrel Zone 4 | 270 | 270 |
| Filter Flange - Die 1 | 270 | 270 |
| Adapter - Die 2 | 270 | 270 |
| Feed Block - Die 3 | 270 | 270 |
| End Flanges - Die 4 | 270 | 270 |
| Flat Die - Die 5 | 270 | 270 |
| Filter Melt | 264 | 254 |
| Adapter Melt | 270 | 250 |
| Before Filter - Pressure (psi) | 1430 | 1800 |
| After Filter - Pressure (psi) | 700 | 910 |
| Screw R.P.M. | 40 | 40 |
| Screw Amps | 2.9 | 2.8 |

TABLE 15-continued

Processing Conditions for Amorphous Example Films 14 and 15

| Example Film # | 14 | 15 |
|---|---|---|
| RESIN | Resin 9 | Resin 10 |
| | 20 wt % 3GT 80 wt % 2GT-I | 70 wt % 3GT 30 wt % 2GT-I |
| EXTRUDER | | |
| Conditions | Temperature Actual | Temperature Actual |
| CASTING UNIT | | |
| Casting Roll-F.P.M. | 53 | 52 |
| Haul Off Roll ratio to cast roll speed | 1.02 | 1.02 |
| Bowed Roll to cast roll ratio | 1.00 | 1.00 |
| Edge Pinners | yes | yes |
| Film Gauge (mls) | 96 | 94 |
| Thru-put (gm/min) | 96 | 94 |
| Thru-put (lb/hr) | 12.7 | 12.4 |
| H2O Recirculation Unit Temperature Set/Act ° F. | 60 | 60 |

Having thus described and exemplified the invention with a certain degree of particularity, it should be appreciated that the following claims are not to be so limited but are to be afforded a scope commensurate with the wording of each element of the claim and equivalents thereof.

We claim:

1. A process comprising heat-sealing two thermoplastics, at least one of which comprises a polyester composition comprising a blend of poly(ethylene terephthalate) homopolymer or copolymer and poly(trimethylene terephthalate) homopolymer or copolymer, or a copolymer formed from the respective monomers and exhibiting an amorphous processing window ranging from a glass transition temperature, Tg, in the range of about 40° C. to about 70° C., to a peak crystallization temperature from the amorphous state, Tcg, in the range of about 70° C. to about 150° C.

2. An article comprising or produced from, two thermoplastic having their surface heat-sealing, at least one of said surfaces comprising a polyester composition comprising a blend of poly(ethylene terephthalate) homopolymer or copolymer and poly(trimethylene terephthalate) homopolymer or copolymer, or a copolymer formed from the respective momomers and exhibiting an amorphous processing window ranging from a glass transition temperature, Tg, in the range of about 40° C. to about 70° C., to a peak crystallization temperature from the amorphous state, Tcg, in the range of about 70° C. to about 150° C.

3. A method for producing a heat-sealable film or sheet comprising the steps of:

(a) extruding a mixture of two distinct polyester fractions comprising from 95 to 5 parts by weight of a poly(ethylene terephthalate) homopolymer or copolymer fraction and from 5 to 95 parts by weight of a poly(trimethylene terephthalate) homopolymer or copolymer fraction wherein said extruding is performed at a polymer residence time in an extruder and die of from 1 to 15 minutes at a temperature from 235 to 290° C.;

(b) quenching the extruded polyester melt produced in step (a); and (c) recovering a polyester film or sheet having an amorphous processing window ranging from a glass transition temperature, Tg, in the range of about 40° C. to about 70° C. to a peak crystallization temperature from the amorphous state, Tcg, in the range of about 70° C. to about 150° C.

4. A method of claim 3 wherein said mixture of two distinct polyester fractions comprises pellets of poly(ethylene terephthalate) homopolymer, pellets of poly(ethylene terephthalate) copolymer or their mixture as one distinct polyester fraction and pellets of poly(trimethylene terephthalate) homopolymer, pellets of poly(trimethylene terephthalate) copolymer, or their mixture as another distinct polyester fraction.

5. A method of claim 3 further comprising the step of drying one or more of said two distinct polyester fractions prior to extruding by exposing said fraction or mixture to a flow of at least 1 ft$^3$/minute of dry air having a dew point less than −5° F., at a temperature ranging from about 120° C. to about 130° C., for at least about six hours.

6. A method of claim 3 wherein said extruding a mixture of two distinct polyester fractions is performed simultaneously with the extruding of at least one other polymer in a coextrusion of a multilayer film or sheet.

* * * * *

UNITED STATES PATENT AND TRADEMARK OFFICE
CERTIFICATE OF CORRECTION

| | | |
|---|---|---|
| PATENT NO. | : 6,902,802 B2 | Page 1 of 1 |
| APPLICATION NO. | : 10/641828 | |
| DATED | : June 7, 2005 | |
| INVENTOR(S) | : Kurian Joseph V., Hahm Diane McCauley and Smillie Benjamin Andrew | |

It is certified that error appears in the above-identified patent and that said Letters Patent is hereby corrected as shown below:

Column 37, line 41, claim 2 - delete "plastic having their surface heat-sealing, at least one of said";
add "plastic having their surfaces heat-sealed, at least one of said"

Signed and Sealed this

First Day of August, 2006

JON W. DUDAS
*Director of the United States Patent and Trademark Office*